(12) United States Patent
Watanabe et al.

(10) Patent No.: US 11,624,865 B2
(45) Date of Patent: Apr. 11, 2023

(54) PLANAR LIGHT SOURCE APPARATUS, DISPLAY APPARATUS, AND ELECTRONIC DEVICE

(71) Applicant: NICHIA CORPORATION, Anan (JP)

(72) Inventors: Shotaro Watanabe, Tsurugashima (JP); Naoki Ishimi, Tokyo (JP); Yoshinori Ito, Kyoto (JP); Tomokazu Shimoda, Tsurugashima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/574,645

(22) Filed: Jan. 13, 2022

(65) Prior Publication Data

US 2022/0146734 A1 May 12, 2022

Related U.S. Application Data

(60) Continuation of application No. 17/077,535, filed on Oct. 22, 2020, now Pat. No. 11,256,017, which is a
(Continued)

(30) Foreign Application Priority Data

Dec. 20, 2016 (JP) .............................. JP2016-246164

(51) Int. Cl.
*F21V 8/00* (2006.01)
*G02F 1/01* (2006.01)
*G02F 1/13357* (2006.01)

(52) U.S. Cl.
CPC ......... *G02B 6/0025* (2013.01); *G02B 6/0016* (2013.01); *G02B 6/0031* (2013.01);
(Continued)

(58) Field of Classification Search
None
See application file for complete search history.

(56) References Cited

U.S. PATENT DOCUMENTS

2006/0061705 A1 3/2006 Onishi
2006/0279964 A1 12/2006 Kitamura
(Continued)

FOREIGN PATENT DOCUMENTS

| CN | 1752820 A | 3/2006 |
|---|---|---|
| CN | 100363821 C | 1/2008 |

(Continued)

OTHER PUBLICATIONS

An English translation of the International Search Report ("ISR") of PCT/JP2017/043615 dated Jan. 30, 2018; Submitted in the Apr. 5, 2019 IDS of the Parent U.S. Appl. No. 16/339,726.
(Continued)

*Primary Examiner* — Ashok Patel
(74) *Attorney, Agent, or Firm* — Metrolex IP Law Group, PLLC

(57) ABSTRACT

To provide a technique for suppressing brightness non-uniformity of an area illuminated by a light source and also suppressing a decline in contrast between areas caused by incidence of a luminous flux of the area to another area. Provided is a light guide plate including: a diverging portion which is provided on an opposite side of a light exit surface from which light is emitted, the diverging portion causing a luminous flux emitted from a light emitting element to diverge; and a restricting portion which is provided, when a prescribed range from the light emitting element on the light exit surface is defined as an illuminated area illuminated by the light emitting element, in at least a periphery of the illuminated area on the light exit surface and which deflects or shields light traveling from inside toward outside of the illuminated area to restrict traveling, toward a side of the light exit surface, of light traveling toward the outside of the illuminated area.

10 Claims, 17 Drawing Sheets

Related U.S. Application Data division of application No. 16/339,726, filed as application No. PCT/JP2017/043615 on Dec. 5, 2017, now Pat. No. 10,852,467.

(52) U.S. Cl.
CPC ...... *G02F 1/0107* (2013.01); *G02F 1/133603* (2013.01); *G02F 1/133606* (2013.01)

(56) References Cited

U.S. PATENT DOCUMENTS

| | | |
|---|---|---|
| 2009/0290093 A1 | 11/2009 | Shimura et al. |
| 2010/0214508 A1 | 8/2010 | Ouchi et al. |
| 2010/0302803 A1 | 12/2010 | Bita et al. |
| 2011/0205453 A1 | 8/2011 | Kasai |
| 2012/0147294 A1 | 6/2012 | Ouchi et al. |
| 2014/0160733 A1 | 6/2014 | Ono et al. |
| 2015/0260988 A1 | 9/2015 | Sugihara et al. |
| 2016/0131927 A1 | 5/2016 | Maesawa et al. |
| 2019/0227382 A1 | 7/2019 | Watanabe et al. |
| 2020/0049876 A1 | 2/2020 | Watanabe et al. |

FOREIGN PATENT DOCUMENTS

| | | |
|---|---|---|
| CN | 102197256 A | 9/2011 |
| CN | 105527749 A | 4/2016 |
| JP | H10-082915 A | 3/1998 |
| JP | 3427636 B2 | 7/2003 |
| JP | 2009-157115 A | 7/2009 |
| JP | 2010-008837 A | 1/2010 |
| JP | 2010-102905 A | 5/2010 |
| JP | 2010-192395 A | 9/2010 |
| JP | 2011-003302 A | 1/2011 |
| JP | 2012-186081 A | 9/2012 |
| JP | 2012-204337 A | 10/2012 |
| JP | 2013-026422 A | 2/2013 |
| JP | 2016-095346 A | 5/2016 |
| KR | 10-2010-0057321 A | 5/2010 |
| WO | 2006030711 | * 3/2006 |

OTHER PUBLICATIONS

An English translation of the written opinion("WO") of the International Searching Authority of PCT/JP2017/043615 dated Jan. 30, 2018; Submitted in the Apr. 5, 2019 IDS of the Parent U.S. Appl. No. 16/339,726.

The Chinese Office Action (CNOA) dated Mar. 4, 2020 in a counterpart Chinese patent application of the Parent U.S. Appl. No. 16/339,726; Submitted in the May 13, 2020 IDS of the Parent U.S. Appl. No. 16/339,726.

The Notice of Preliminary Rejection dated May 20, 2020 in a counterpart Korean patent application of the Parent U.S. Appl. No. 16/339,726; Submitted in the Jul. 2, 2020 IDS of the Parent U.S. Appl. No. 16/339,726.

The Office Action (JPOA) dated Dec. 1, 2020 in a counterpart Japanese patent application of the Parent U.S. Appl. No. 17/077,535; Submitted in the Jul. 25, 2021 IDS of the Parent U.S. Appl. No. 17/077,535.

Office action letter dated Apr. 2, 2020 in a parent U.S. Appl. No. 16/339,726.

Office action letter dated Jun. 15, 2021 in a parent U.S. Appl. No. 17/077,535.

* cited by examiner

PLANAR LIGHT SOURCE APPARATUS, DISPLAY APPARATUS, AND ELECTRONIC DEVICE

CROSS REFERENCE TO RELATED APPLICATION

This application is a is a continuation application of a pending divisional application Ser. No. 17/077,535, filed on Oct. 22, 2020, which is a divisional application Ser. No. 16/339,726, filed on Apr. 5, 2019, which issued on Dec. 1, 2020 as U.S. Pat. No. 10,852,467, which is a National Stage Application under 35 USC § 371 of PCT International Application No. PCT/JP2017/043615, which is based upon and claims the benefit of priority from the prior Japanese Patent Application No. 2016-246164, filed on Dec. 20, 2016, the entire contents of all of which are incorporated herein by reference.

TECHNICAL FIELD

The present invention relates to a light guide plate, a planar light source apparatus, a display apparatus, and an electronic device.

BACKGROUND ART

Backlight systems for liquid crystal display apparatuses include a system referred to as an edge light-type backlight and a system referred to as a direct-type backlight. Direct-type backlights which feature high light utilization efficiency and which enable higher brightness to be readily achieved are used in displays of large-size liquid crystal display apparatuses. In addition, for example, an LED (Light Emitting Diode) which emits white light is used as a light source of a backlight. In the case of a direct-type backlight, while a plurality of LEDs are arranged directly underneath a liquid crystal display apparatus, brightness non-uniformity easily occurs in the liquid crystal display apparatus between portions directly above the LEDs and other portions.

Conventionally, a planar light source apparatus has been proposed in which a light source is installed in a conical depression for light source insertion provided on a rear surface of a light guide plate, and light-scattering dots for scattering light inside the light guide plate are provided on the rear surface of the light guide plate, the planar light source apparatus being configured so that at least a part of light from the light source is first reflected by a front surface and/or the rear surface of the light guide plate and subsequently emitted from the front surface of the light guide plate (refer to PTL 1).

CITATION LIST

Patent Literature

[Patent Document 1] Japanese Patent No. 3427636

SUMMARY OF INVENTION

Technical Problem

In addition, in a direct-type backlight, a plurality of LEDs are arranged in a matrix pattern constituted by vertical columns and horizontal rows on a surface directly underneath a display, and so-called local dimming may be performed in which light on/off of each LED is controlled so as to partially change brightness of a display region based on data of an image displayed on the display.

When adjusting brightness for each area in which an LED is provided in a backlight performing local dimming, while a luminous flux from each LED must be diffused to suppress brightness non-uniformity on a display surface within the area in which the LED is provided, there is a problem in that leakage of the diffused luminous flux to another area causes a decline in contract between areas.

In consideration of such circumstances, an object of the present invention is to provide a technique for suppressing brightness non-uniformity of an area illuminated by a light source and also suppressing a decline in contrast between areas caused by incidence of a luminous flux of the area to another area.

Solution to Problem

In the present invention, the following means is adopted in order to solve the problem described above. Specifically, a light guide plate according to the present invention includes: a diverging portion which is provided on an opposite side of a light exit surface from which light is emitted, the diverging portion causing a luminous flux emitted from a light emitting element to diverge; and a restricting portion which is provided, when a prescribed range from the light emitting element on the light exit surface is defined as an illuminated area illuminated by the light emitting element, in at least a periphery of the illuminated area on the light exit surface and which deflects or shields light traveling from inside toward outside of the illuminated area to restrict traveling, toward a side of the light exit surface, of light traveling toward the outside of the illuminated area.

As described above, using the diverging portion, light traveling directly upward from the light emitting element is reduced while light traveling toward the periphery of the illuminated area is increased. In addition, the restricting portion is used to restrict traveling, toward the side of the light exit surface outside of the illuminated area, of a luminous flux traveling from the inside toward the outside of the illuminated area. Accordingly, brightness non-uniformity in the illuminated area can be suppressed and a decline in contrast between illuminated areas caused by the incidence of a luminous flux of the illuminated area to another illuminated area can also be suppressed.

In the light guide plate described above, the restricting portion provided on the light exit surface may be defined as a first restricting portion, and a second restricting portion which opposes the first restricting portion may be provided on a surface on an opposite side of the light exit surface.

In the light guide plate described above, the diverging portion may be a depressed portion with a conical shape, a truncated cone shape, a pyramid shape, a truncated pyramid shape, or a bowl shape, the depressed portion being provided on a surface on an opposite side of the light exit surface and housing the light emitting element.

In the light guide plate described above, a plurality of diffusing portions which diffuse light may be provided on the light exit surface.

In the light guide plate described above, the restricting portion may be a groove provided on the light exit surface or a side surface of the light guide plate.

In the light guide plate described above, a reflective layer which reflects light may be provided in a portion, other than the diverging portion, of a surface on an opposite side of the light exit surface.

In the light guide plate described above, the diverging portion may be a protruding portion with a conical shape, a truncated cone shape, a pyramid shape, a truncated pyramid shape, or a bowl shape the protruding portion being provided on a surface on an opposite side of the light exit surface and being oriented toward the light emitting element.

In order to solve the problem described above, a planar light source apparatus according to the present invention includes:
a light emitting element; and
the light guide plate described above which guides light emitted from the light emitting element.

In addition, a planar light source apparatus according to the present invention includes a light emitting element, and a light guide plate which guides light emitted from the light emitting element, the planar light source apparatus further including: a diverging portion which is a protruding portion with a conical shape, a truncated cone shape, a pyramid shape, a truncated pyramid shape, or a bowl shape oriented toward the light emitting element and provided on a surface on an opposite side of a light exit surface from which light is emitted from the light emitting element of the light guide plate, the diverging portion causing a luminous flux emitted from the light emitting element to diverge; and a restricting portion which is a reflective surface provided in a periphery of the light emitting element and which, when a prescribed range from the light emitting element on the light exit surface is defined as an illuminated area illuminated by the light emitting element, reflects light traveling from inside toward outside of the illuminated area to restrict traveling, toward a side of the light exit surface, of light traveling toward the outside of the illuminated area.

Furthermore, the present invention may be provided as a display apparatus including the planar light source apparatus described above and a display panel which receives light emitted from the planar light source apparatus and may be further provided as an electronic device including the display apparatus.

Advantageous Effects of Invention

According to the present invention, it is possible to provide a technique for suppressing brightness non-uniformity of an area illuminated by a light source and also suppressing a decline in contrast between areas caused by incidence of a luminous flux of the area to another area.

DESCRIPTION OF EMBODIMENTS

Hereinafter, an embodiment of the present invention will be described with reference to the drawings. It is to be understood that the embodiment described below merely represents examples of implementing the present invention and are not intended to limit the present invention to the specific configurations described hereinafter.

In the embodiment described below, the "display apparatus" will be described as a liquid crystal display apparatus and the "planar light source apparatus" will be described as a backlight of the liquid crystal display apparatus.

(Configuration of Liquid Crystal Display Apparatus)

Figure 1:
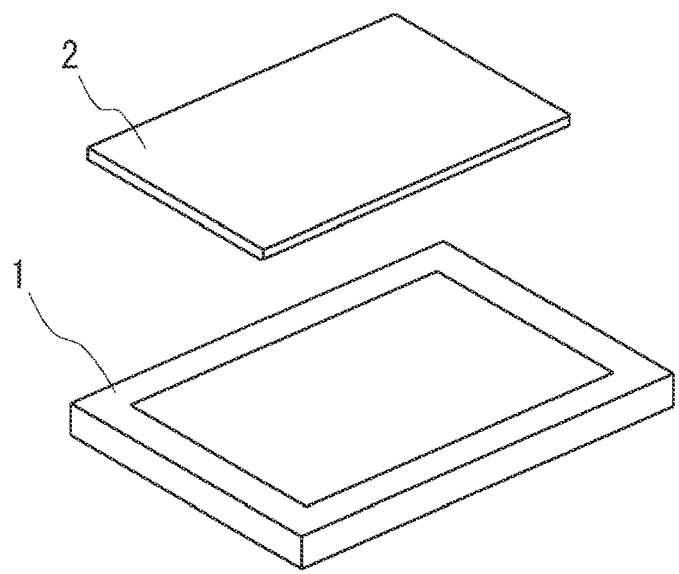
FIG. 1 is a perspective view illustrating a configuration of a liquid crystal display apparatus.

FIG. 1 is a perspective view illustrating a configuration of a liquid crystal display apparatus according to the embodiment. As shown in FIG. 1, the liquid crystal display apparatus includes: a planar light source apparatus 1 arranged as a backlight; and a display panel 2 which receives light emitted from the planar light source apparatus 1. The display panel 2 displays images by applying voltage to liquid crystals encapsulated by being sandwiched between glass plates and increasing or reducing transmittance of light. Hereinafter, in the planar light source apparatus 1, a side of the display panel 2 may be described as an upper surface side and a side of an opposite surface thereof may be described as a lower surface side.

(Configuration of Planar Light Source Apparatus 1)

Figure 2:
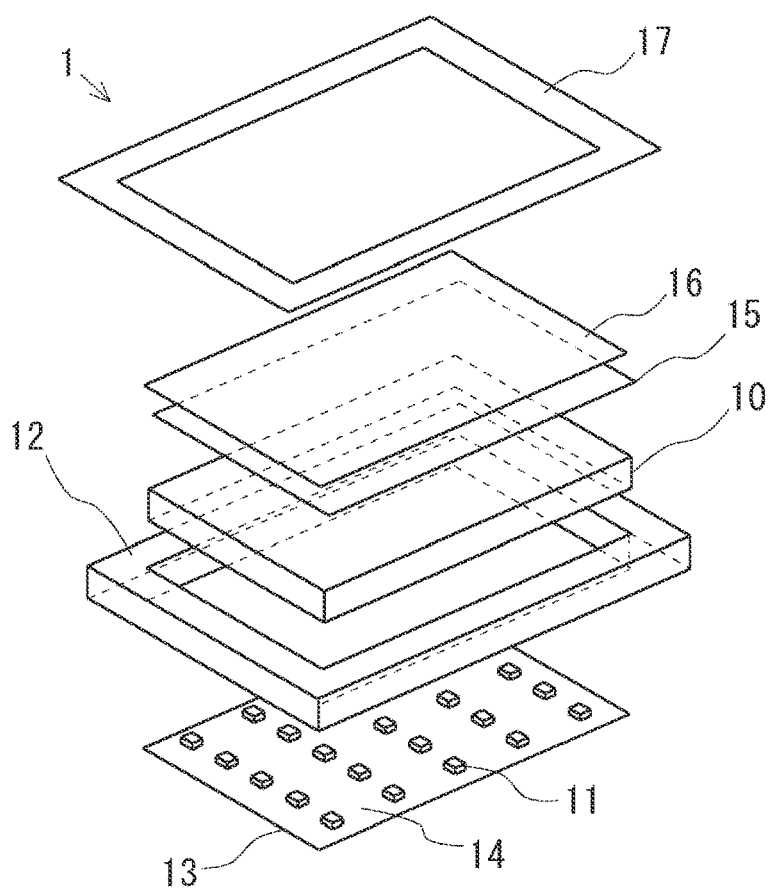
FIG. 2 is a perspective view illustrating a configuration of a planar light source apparatus.

FIG. 2 is a perspective view illustrating a configuration of the planar light source apparatus 1 according to the embodiment. The planar light source apparatus 1 includes a light guide plate 10 and a frame 12. In addition, the planar light source apparatus 1 includes a plurality of light sources 11, a mounting substrate 13, and a reflective layer 14 arranged on the lower surface side of the light guide plate 10. The lower surface side of the light guide plate 10 is an opposite side of a side on which the display panel 2 is arranged. The planar light source apparatus 1 further includes a diffusing sheet 15, a prism sheet 16, and a light shielding member 17 laminated in order on the upper surface side of the light guide plate 10. The upper surface side of the light guide plate 10 is the side on which the display panel 2 is arranged. One or a plurality of diffusing sheets 15 and prism sheets 16 may be provided or the diffusing sheet 15 and the prism sheet 16 may be omitted.

The light guide plate 10 has an approximately flat plate shape and is molded from a translucent material such as a polycarbonate resin or a polymethyl methacrylate resin. The light guide plate 10 need only have a plate shape along the display panel 2 and, when the display panel 2 is curved, the light guide plate 10 desirably has a similarly curved plate shape. An upper surface of the light guide plate 10 is a light exit surface from which light is emitted and which faces the display panel 2. The light guide plate 10 is configured such that light incident into the light guide plate 10 is guided to the light exit surface and the entire light exit surface is uniformly lighted.

The light source 11 is a light emitting element which receives supply of power and which emits white light from a light emitting surface. While the light source 11 is, for example, an LED package, a light source other than an LED package may be used instead. The light source 11 is formed by encapsulating an LED chip that is a light emitting element with a translucent resin (resin layer) containing phosphor. Alternatively, instead of arranging the phosphor on the LED chip, a phosphor layer may be arranged on the light exit surface of the light guide plate 10 or a phosphor layer may be arranged on the diffusing sheet 15. The light source 11 is driven by receiving supply of power from the mounting substrate 13. A light source with a color other than white may be used as the light source 11. The light source 11 is arranged below the light guide plate 10.

The frame 12 is a frame-like member (an example of a "frame body") which has an opening and which is constituted by four sides. The frame 12 is molded from a polycarbonate resin containing titanium oxide, a polycarbonate resin not containing titanium oxide, or the like. The light guide plate 10 is fitted into the frame 12, and an inner circumferential surface of the frame 12 surrounds a side surface of the light guide plate 10 that forms an outer circumferential surface of the light guide plate 10. The frame 12 has high reflectance and reflects and reuses light having leaked from the side surface of the light guide plate 10. The mounting substrate 13 is a substrate on which wiring is provided by a conductive foil on an insulating substrate and which is mounted so that the light source 11 is electrically connected with the wiring.

The plurality of light sources 11 and the reflective layer 14 are provided on the mounting substrate 13. The reflective layer 14 is provided around the light sources 11. The reflective layer 14 is, for example, a white resin, a metal foil, or the like with high reflectance, and reflects light traveling toward the lower surface side inside the light guide plate 10 and returns the light to the side of the light exit surface. The diffusing sheet 15 is a semi-transparent resin film which diffuses light emitted from the light exit surface of the light guide plate 10 and which widens directional characteristics of the light. The prism sheet 16 is a transparent resin film which has a fine triangular prism-shaped pattern formed on an upper surface thereof and which collects light diffused by the diffusing sheet 15 and heightens brightness when the planar light source apparatus 1 is viewed from the upper surface side.

The light shielding member 17 has a frame shape when the planar light source apparatus 1 is viewed from the upper surface side. The frame shape need only be a shape that surrounds the light guide plate 10 in a similar manner to the upper surface of the frame 12 and may be, for example, a rectangle shape, an approximately ellipsoidal shape, or another shape. For example, the light shielding member 17 may be a black adhesive tape in which both upper and lower faces are adhesive faces. A frame portion of the light shielding member 17 is bonded along an upper end of the frame 12 and prevents light from leaking from the planar light source apparatus 1.

First Specific Example

Figure 3:
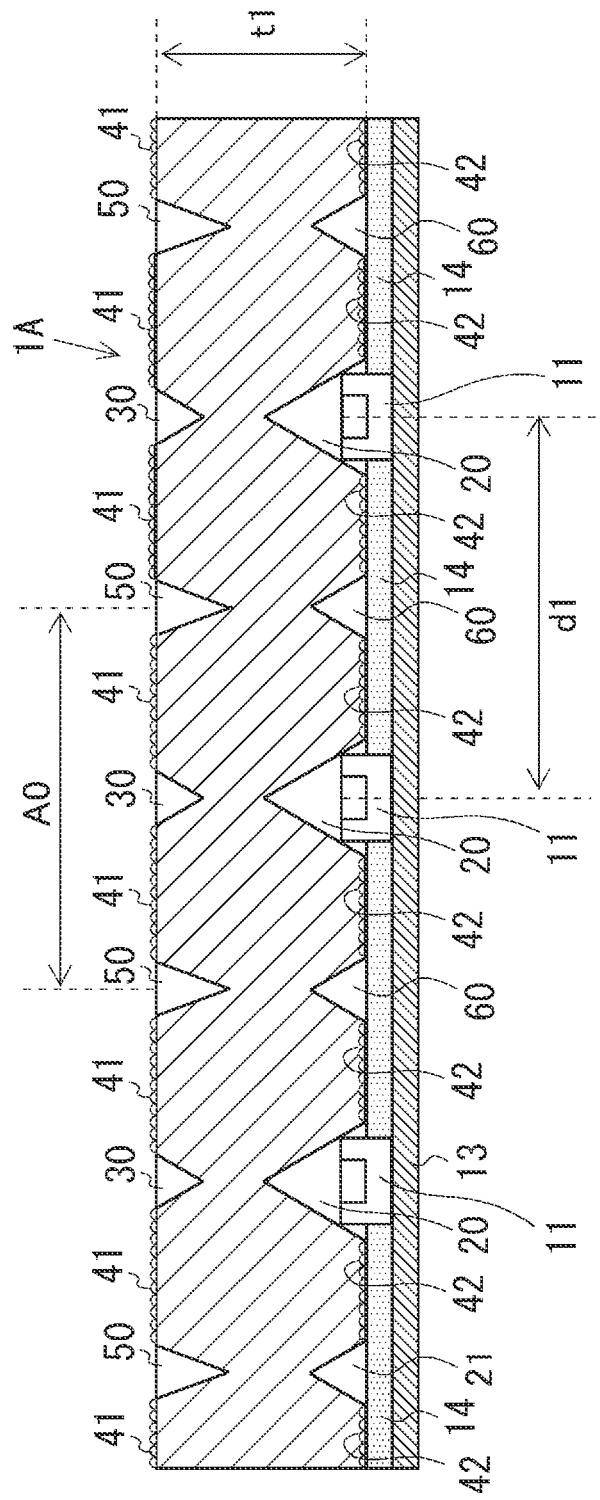
FIG. 3 is a sectional view of a light guide plate.

FIG. 3 is a sectional view of the light guide plate 10. A ratio of sizes of the respective components and the like are not limited to the illustrated example. The light guide plate 10 has a plurality of depressed portions 20 on the lower surface of the light guide plate 10. The depressed portion 20 has a conical shape. The plurality of light sources 11 are arranged on the mounting substrate 13 and one light source 11 is housed inside each depressed portion 20. Light emitted from the light source 11 is incident into the light guide plate 10. Due to light incident into the light guide plate 10 being refracted, reflected, and diffused inside the light guide plate 10 and emitted from a light exit surface 1A of the light guide plate 10, the light exit surface 1A of the light guide plate 10 is uniformly lighted. While a thickness (height) t1 of the light guide plate 10 is, for example, 0.35 mm, the thickness (height) t1 is not limited to this value and may assume another value such as 0.2 to 20 mm. While a pitch dl of the light sources 11 is, for example, 2 to 7 mm, the pitch dl is not limited to these values and may assume other values.

Figure 4:
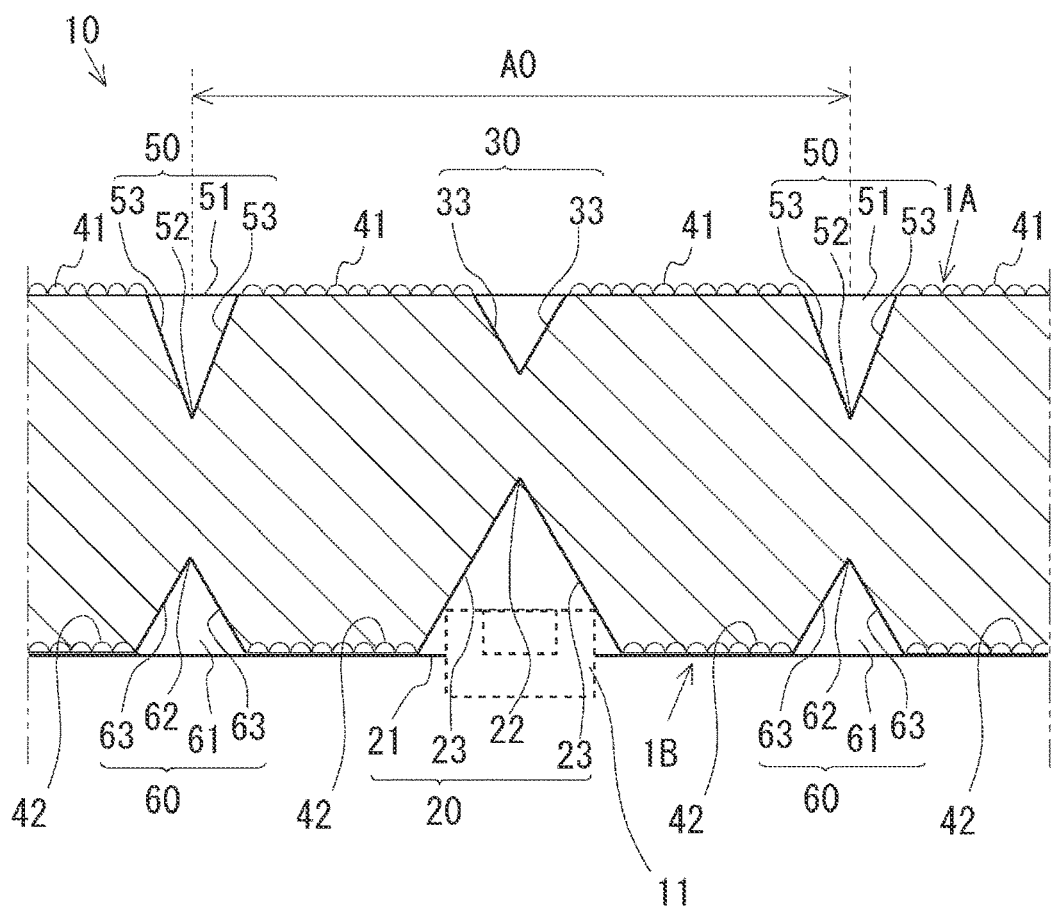
FIG. 4 is an enlarged sectional view of a light guide plate.

FIG. 4 is an enlarged sectional view of the light guide plate 10. The light guide plate 10 includes an incidence surface to which light from the light source 11 is incident, the light exit surface 1A which emits light incident from the incidence surface, and a basal surface 1B on an opposite side of the light exit surface 1A. The basal surface 1B of the light guide plate 10 constitutes the lower surface of the light guide plate 10. The depressed portion 20 is provided on the basal surface 1B of the light guide plate 10. The depressed portion 20 with a conical shape has an opening 21 and a tapered surface (an incidence surface) 23 which narrows from the opening 21 toward a vertex 22. In other words, a diameter of the depressed portion 20 decreases upward from the opening 21. The tapered surface 23 is a mirror surface or a smooth surface similar to a mirror surface. A diameter of the opening 21 in the depressed portion 20 and a height (depth) of the depressed portion 20 are arbitrary values. Alternatively, the depressed portion 20 may have a truncated cone shape, a pyramid shape, a truncated pyramid shape, a bowl shape, a bell shape, or the like. In addition, a shape, a height, and a width of the light source 11 are also not particularly limited. For example, the light source 11 may have a shape and a size which enable a light emitting surface of the light source 11 to be housed inside the depressed portion 20.

A luminous flux emitted from the light source 11 is refracted and diverged by the tapered surface 23 of the depressed portion 20. The depressed portion 20 is a mode of the diverging portion according to the present example.

In addition, a depressed portion 30 which is a conical depression in a similar manner to the depressed portion 20 is provided at a position opposing the depressed portion 20 on a side of the light exit surface of the light guide plate 10. A diameter of an opening of the depressed portion 30 and a height (depth) of the depressed portion 30 are also arbitrary values. Alternatively, the depressed portion 30 may have a truncated cone shape, a pyramid shape, a truncated pyramid shape, a bowl shape, a bell shape, or the like. The depressed portion 30 is a mode of a diverging portion which causes a luminous flux emitted from the light source 11 to be refracted and diverged by a tapered surface 33. In the present example, when the depressed portion 20 is defined as a first diverging portion, the depressed portion 30 is a mode of a second diverging portion.

On the light exit surface 1A, a prescribed range centered on the light source 11 is defined as an illuminated area A0 illuminated by the light source 11, and a groove portion 50 is provided in a periphery of the illuminated area A0 on the light exit surface 1A. The groove portion 50 has a V-shaped cross section and includes an opening 51 and inclined surfaces 53 of which a space therebetween narrows from the opening 51 toward a lower end 52. A width of the opening 51 in the groove portion 50 and a height (depth) of the groove portion 50 are arbitrary values. The groove portion 50 is a restricting portion which deflects light traveling from inside toward outside of the illuminated area A0 to restrict traveling, toward a side of the light exit surface, of light traveling toward the outside of the illuminated area A0. In the present embodiment, deflection refers to changing an orientation (direction of travel) of light by an optical effect such as refraction, reflection, or diffraction. The illuminated area A0 represents a unit of a region in which brightness is adjusted when performing local dimming. As shown in FIG. 3, a width (length) of the illuminated area A0 according to the present example is the same as a pitch dl between light sources 11 in a direction of arrangement of the light sources 11.

In addition, a groove portion 60 which is a depression with a V-shaped cross section in a similar manner to the groove portion 50 is provided at a position opposing the groove portion 50 on the side of the light exit surface of the light guide plate 10. The groove portion 60 has a V-shaped cross section and includes an opening 61 and inclined surfaces 63 of which a space therebetween narrows from the opening 61 toward an upper end 62. A width of the opening 61 and a height (depth) of the groove portion 60 are arbitrary values. The groove portion 60 is a restricting portion which deflects light traveling from the inside toward the outside of the illuminated area A0 to restrict traveling, toward a side of the light exit surface, of light traveling toward the outside of the illuminated area A0. In the present example, when the groove portion 50 is defined as a first restricting portion, the groove portion 60 is a second restricting portion.

Figure 5:
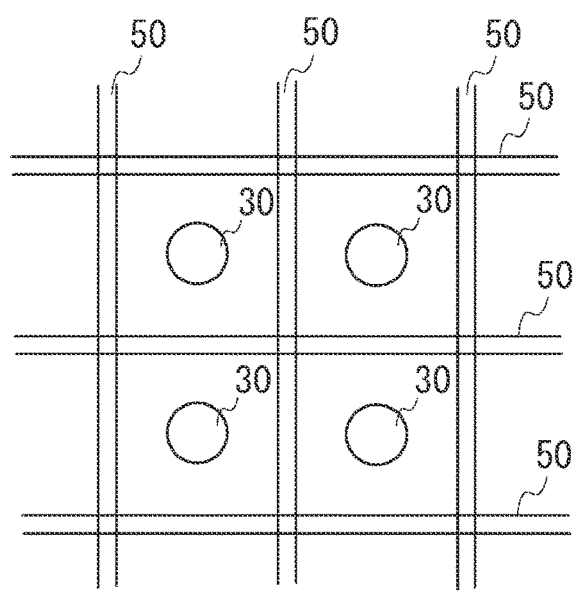
FIG. 5 is a plan view showing a part of a light guide plate.

FIG. 5 is a plan view showing a part of the light guide plate 10. In the light guide plate 10, a square range centered on each of the light sources 11 arranged in a matrix pattern is defined as the illuminated area A0 illuminated by each light source 11, and the groove portion 50 is vertically and horizontally provided along the periphery of the illuminated area A0. Moreover, although not illustrated, the groove portion 60 is also vertically and horizontally provided on the basal surface 1B of the light guide plate 10 in a similar manner to the groove portion 50 shown in FIG. 5. A planar shape of the illuminated area A0 provided with the groove portion 50 in the periphery thereof may be other shapes. Any shape capable of tessellating a plane such as a rectangle or a hexagon may be adopted.

On the light exit surface 1A of the light guide plate 10, a plurality of dot patterns 41 are provided in a portion other than the depressed portion 30 and the groove portion 50. In addition, on the basal surface 1B of the light guide plate 10, a plurality of dot patterns 42 are provided in a portion other than the depressed portion 20 and the groove portion 60. The light inside the light guide plate 10 is refracted and diffused by the dot patterns 41 provided on the light exit surface 1A of the light guide plate 10 and the dot patterns 42 provided on the basal surface 1B of the light guide plate 10. The dot patterns 41 and 42 are examples of the diffusing portion.

While the dot patterns 41 shown in FIG. 4 have a projection shape (convex shape) that projects toward the outside of the light guide plate 10, the dot patterns 41 are not limited to this shape and may have a concave shape that is depressed toward the inside of the light guide plate 10. While the dot patterns 42 shown in FIG. 4 have a concave shape that is depressed toward the inside of the light guide plate 10, the dot patterns 42 are not limited to this shape and may have a projection shape (convex shape) that projects toward the outside of the light guide plate 10. Examples of the projection shape include a convex lens shape, a columnar shape, a prismatic shape, a conical shape, and a pyramid shape. Examples of the concave shape include a concave lens shape, a columnar groove shape, a prismatic groove shape, a conical groove shape, and a pyramid groove shape. The dot patterns 41 and 42 may be any of a circle, an ellipse, and a polygon in a plan view. The dot patterns 41 and 42 may be integrally formed with the light guide plate 10 when the light guide plate 10 is manufactured by injection molding. Alternatively, the dot patterns 41 and 42 may be separately formed on the light guide plate 10 by an ink-jet or the like. The dot patterns 41 and 42 may have minute irregularities on surfaces thereof. Forming minute irregularities on the surfaces of the dot patterns 41 and 42 enables light incident to the dot patterns 41 and 42 to be further diffused.

Figure 6A:
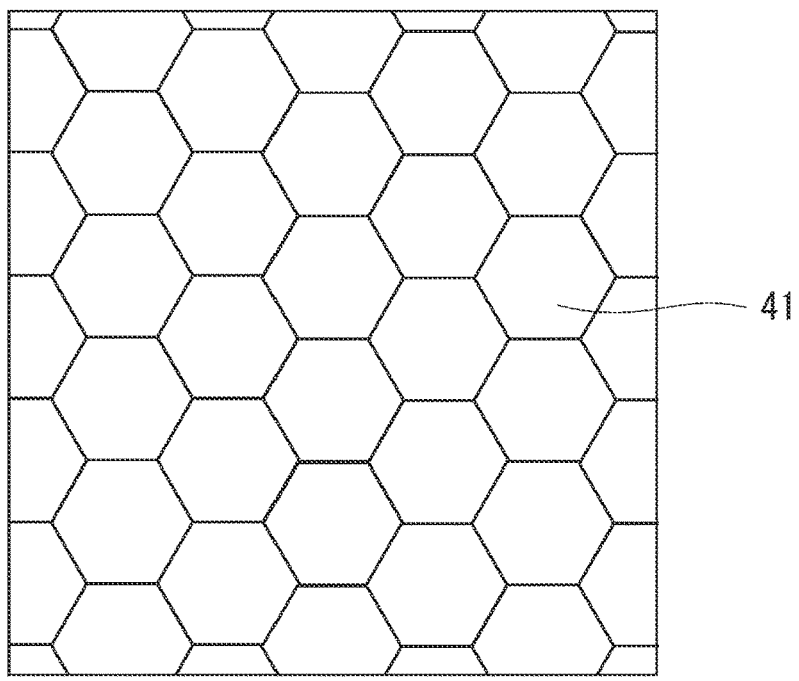
FIG. 6A is a plan view of a dot pattern.
Figure 6B:
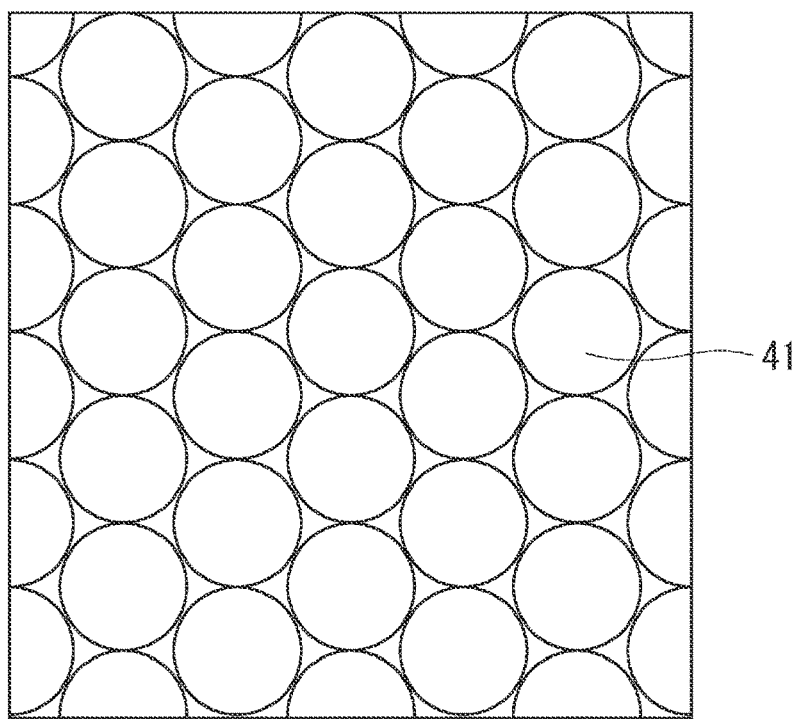
FIG. 6B is a plan view of a dot pattern.

The plurality of dot patterns 41 and 42 are respectively densely arranged. While the plurality of dot patterns 41 and 42 may be discretely arranged, in order to enhance an effect of diffusing light inside the light guide plate 10 and light emitted from the light exit surface 1A of the light guide plate 10 so that the light becomes uniform, the plurality of dot patterns 41 and 42 are preferably densely arranged. For example, as shown in FIG. 6A, the plurality of dot patterns 41 may be arranged in a closest-packed arrangement. FIG. 6A is a plan view of the dot patterns 41 as viewed from a normal direction of the light exit surface 1A of the light guide plate 10. The dot patterns 41 shown in FIG. 6A have a hexagonal shape in a plan view and the plurality of the dot patterns 41 are arranged adjacent to each other. Alternatively, for example, the plurality of dot patterns 41 may be arranged as shown in FIG. 6B. FIG. 6B is a plan view of the dot patterns 41 as viewed from a normal direction of the light exit surface 1A of the light guide plate 10. The dot patterns 41 shown in FIG. 6B have a circular shape in a plan view and the plurality of the dot patterns 41 are arranged adjacent to each other. While a width of the dot patterns 41 and 42 is, for example, 30·m and a height of the dot patterns 41 and 42 is, for example, 5 to 6·m, the width and the height of the dot patterns 41 and 42 are not limited to these values and may assume other values.

The dot patterns 41 and 42 may have a same size (height and width) or may respectively have different sizes. The dot patterns 41 and the dot patterns 42 may have a same size or the dot patterns 41 and the dot patterns 42 may have different sizes. The sizes of the dot patterns 41 and 42 may be changed in accordance with a value of the thickness of the light guide plate 10 and a value of the pitch between adjacent light sources 11.

As shown in FIG. 4, the light guide plate 10 according to the present example includes the depressed portions 20 and 30 above the light source 11 and causes a luminous flux traveling upward from the light source 11 to diverge. Accordingly, light traveling directly upward from the light source 11 is reduced while light traveling toward the periphery of the illuminated area A0 is increased. In addition, light traveling toward the periphery of the illuminated area A0 and light reflected inside the light guide plate 10 are diffused by the diffusing portions 41 and 42. Accordingly, brightness on the light exit surface 1A is made uniform.

Figure 7:
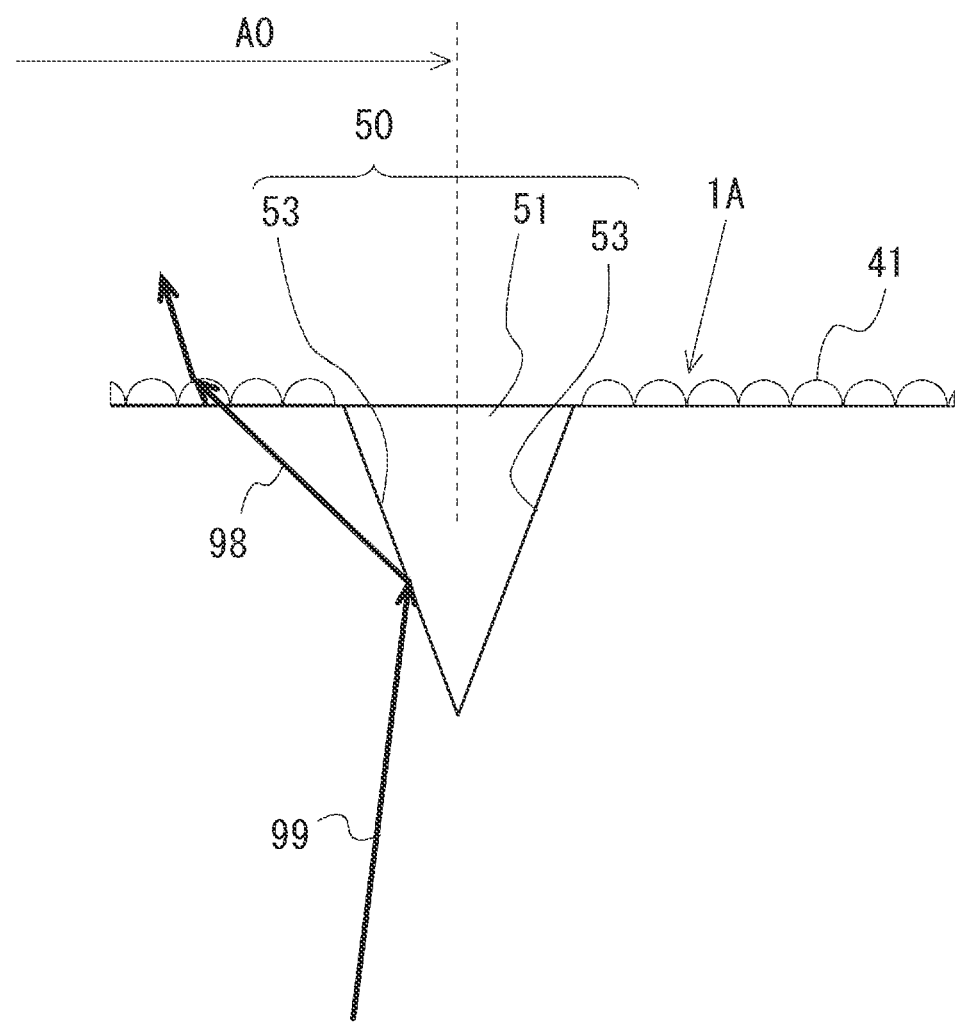
FIG. 7 is a diagram showing a direction of travel when light traveling from inside toward outside of the illuminated area is incident to a groove portion.

In addition, the light guide plate 10 according to the present example includes groove portions 50 and 60 along the periphery of the illuminated area A0. Accordingly, light traveling from the inside toward the outside of the illuminated area A0 is deflected to restrict traveling, toward the side of the light exit surface, of light traveling toward the outside of the illuminated area A0. FIG. 7 is a diagram showing a direction of travel when light traveling from the inside toward the outside of the illuminated area A0 is incident to the groove portion 50. As shown in FIG. 7, when light 99 traveling from the inside toward the outside of the illuminated area A0 reaches the groove portion 50, when an angle of incidence with respect to the inclined surface 53 is equal to or larger than a critical angle, the light 99 is subjected to total reflection and returns to the inside of the illuminated area A0 as indicated by light 98. Since emission from the light exit surface 1A outside of the illuminated area A0 of the light source 11 by light emitted from the light source 11 is suppressed, a decline in contrast between illuminated areas when performing local dimming can be suppressed.

Second Specific Example

Figure 8:
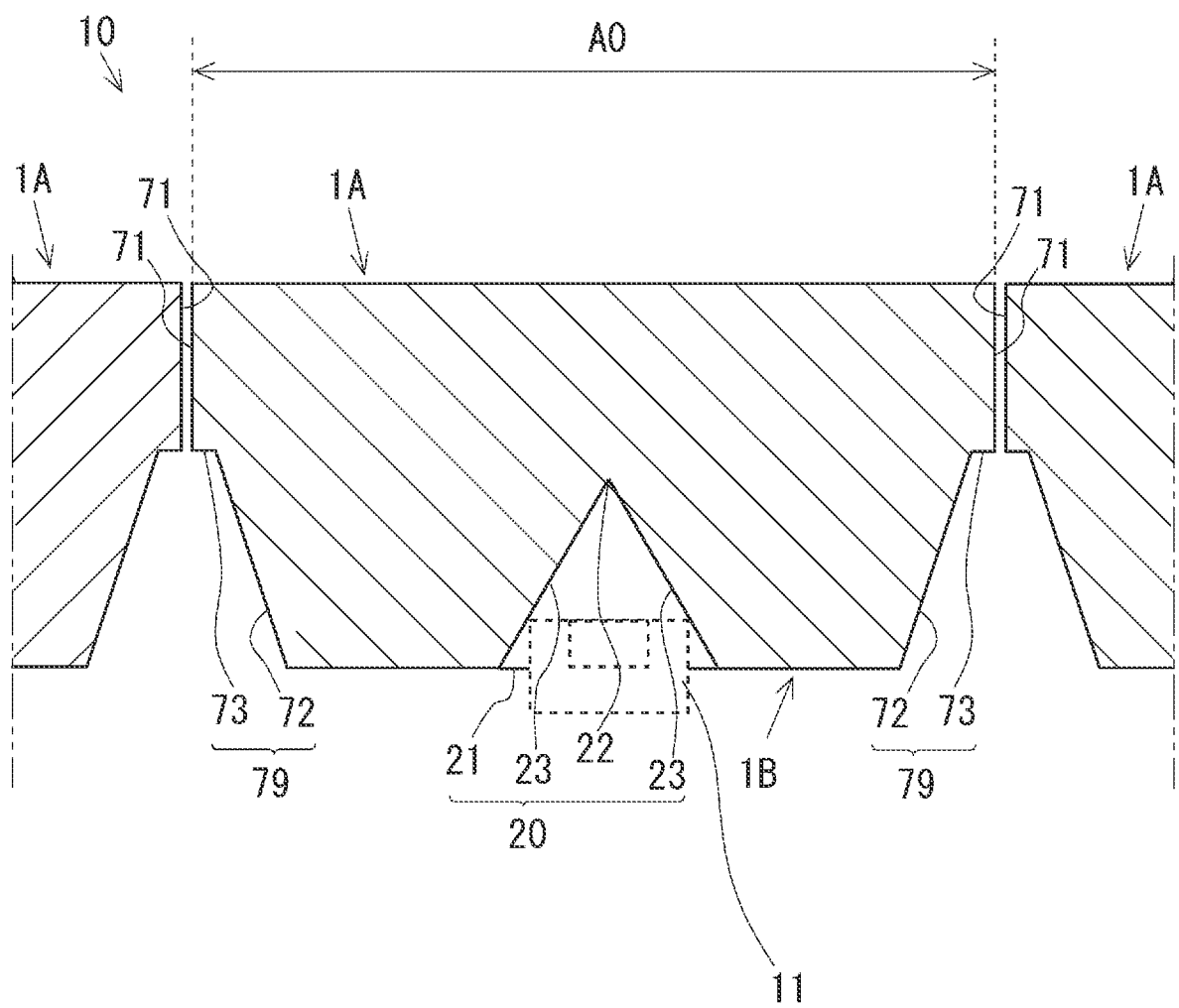
FIG. 8 is a sectional view schematically showing a second specific example of a light guide plate.

FIG. 8 is a sectional view schematically showing a second specific example of the light guide plate 10. In the present specific example, components corresponding to the configuration described above will be assigned corresponding reference numerals and a description thereof will be omitted.

The light guide plate 10 according to the present specific example is configured so as to be formed by an individual piece for each light source 11 and arranged in a matrix pattern corresponding to the light sources 11.

The first restricting portion according to the present second specific example is constituted by a side surface 71 of the light guide plate 10 formed as an individual piece. For example, by installing individual pieces of the light guide plate 10 in a row while providing minute gaps between the side surfaces 71 and reflecting light incident to the side surface 71 at angles exceeding the critical angle, traveling, toward the side of the light exit surface outside the illuminated area A0, of light traveling from the inside toward the outside of the illuminated area A0 is restricted. In addition to a configuration in which gaps are provided between the side surfaces 71, light traveling from the inside toward the outside of the illuminated area A0 can be shielded or reflected by applying a light shielding coating material or forming a reflective layer on the side surface 71.

In addition, a notched portion 79 constituted by an inclined surface 72 and a surface 73 parallel to the basal surface 1B is provided on the side of the basal surface 1B of the side surface 71, and when the individual pieces of the light guide plate 10 are arranged in a row, the notched portion 79 constitutes the second restricting portion in a similar manner to the groove portion 60 shown in FIG. 4.

Even in the configuration shown in FIG. 8, due to the depressed portion 20 provided above the light source 11, light traveling directly upward from the light source 11 is reduced while light traveling toward the periphery of the illuminated area A0 is increased. In addition, the side surface 71 that is the first restricting portion and the notched portion 79 that is the second restricting portion are used to restrict traveling, toward the side of the light exit surface outside of the illuminated area A0, of a luminous flux traveling from the inside toward the outside of the illuminated area A0.

Accordingly, brightness non-uniformity in the illuminated area A0 that is illuminated by the light source 11 can be suppressed and a decline in contrast between illuminated areas caused by the incidence of a luminous flux of the illuminated area A0 to another illuminated area can also be suppressed.

Although not illustrated in FIG. 8, even in the light guide plate 10 according to the present example, the dot patterns 41 and the depressed portion 30 (the second diverging portion) may be provided on the light exit surface 1A in a similar manner to FIG. 4. In addition, the dot patterns 42 may be provided in a portion, other than the depressed portion 20 and the notched portion 79, of the basal surface 1B in a similar manner to FIG. 4.

Third Specific Example

Figure 9:
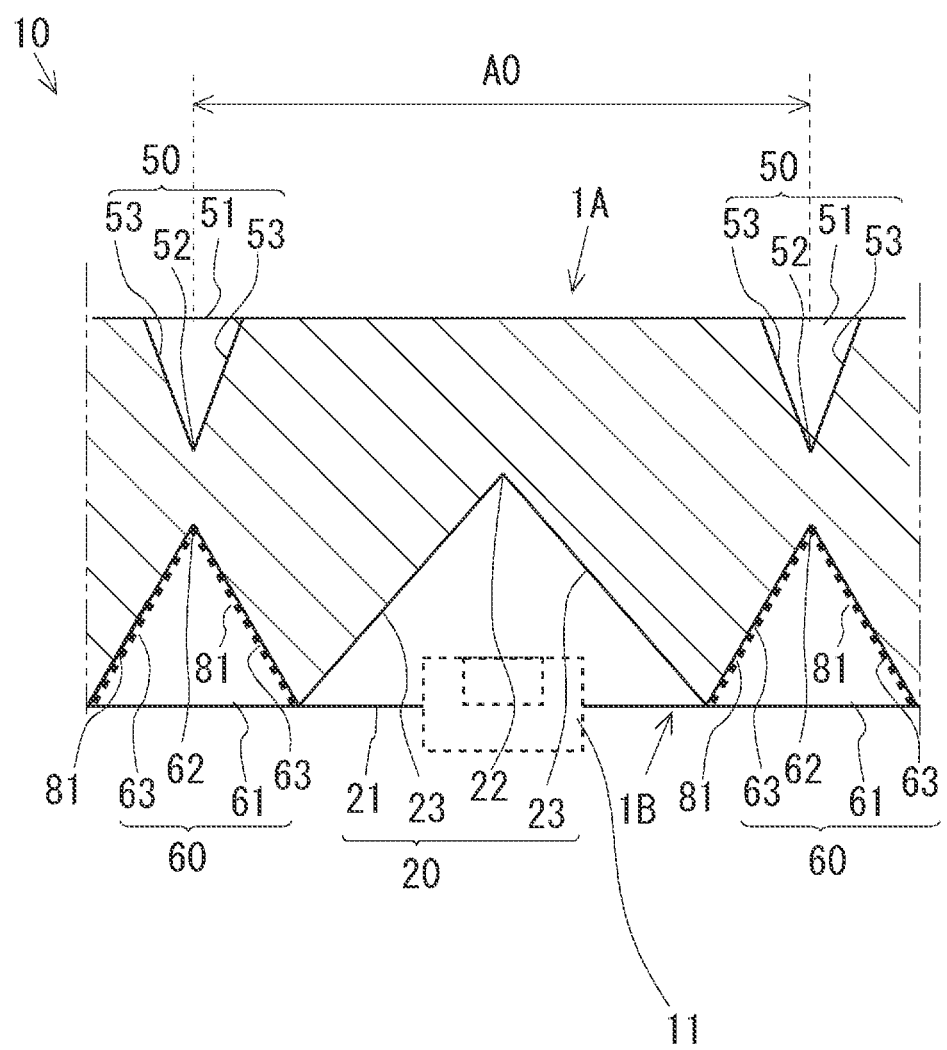
FIG. 9 is a sectional view schematically showing a third specific example of a light guide plate.

FIG. 9 is a sectional view schematically showing a third specific example of the light guide plate 10. In the present third specific example, components corresponding to the configurations described above will be assigned corresponding reference numerals and a description thereof will be omitted.

As shown in FIG. 9, in the present third specific example, a reflective layer 81 is formed on an inner surface of the groove portion 60. By forming a reflective surface on the inclined surface 63 of the groove portion 60 in this manner, light traveling from the inside toward the outside of the illuminated area A0 is reflected toward the inside of the illuminated area A0 when striking the groove portion 60. This configuration restricts traveling, toward the side of the light exit surface outside of the illuminated area A0, of light traveling from the inside toward the outside of the illuminated area A0.

Figure 10:
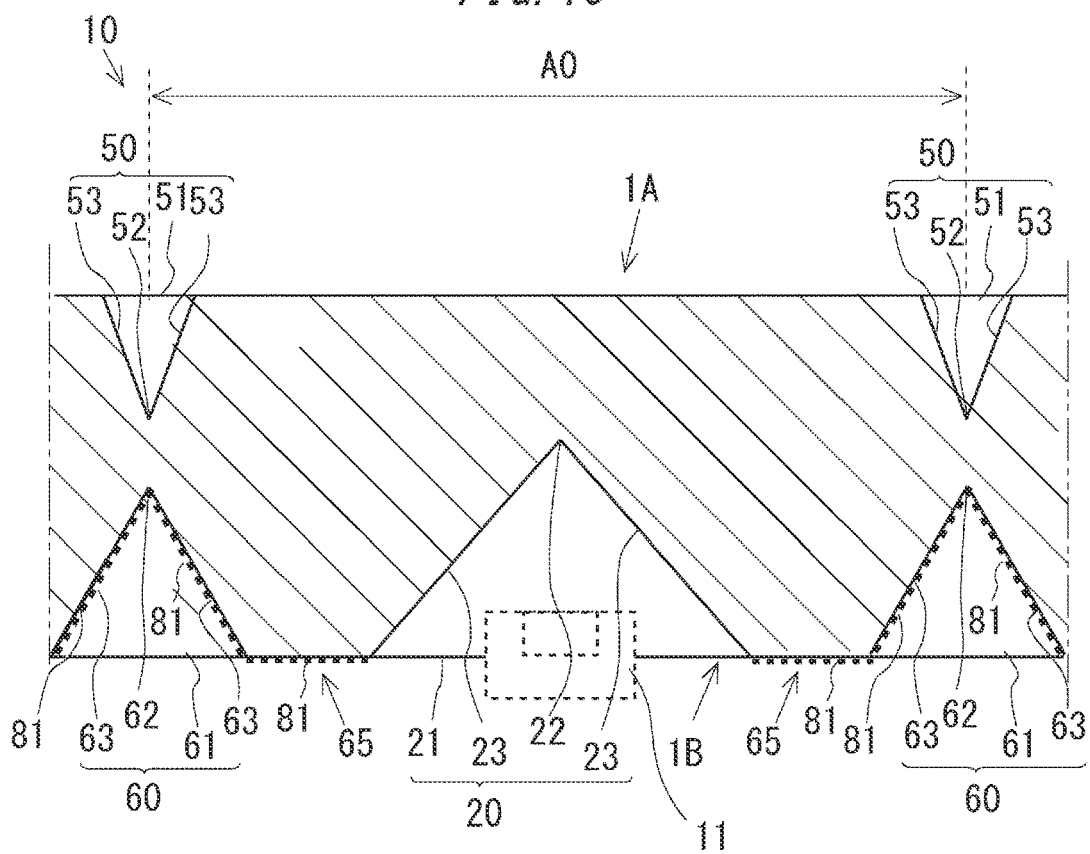
FIG. 10 is a sectional view showing a modification of a light guide plate according to the third specific example.

In addition, FIG. 10 is a diagram showing a modification of the light guide plate 10 described above. While only the depressed portion 20 and the groove portion 60 are shown on the basal surface 1B of the light guide plate 10 in FIG. 9, as shown in FIG. 10, the basal surface 1B of the light guide plate 10 may include a flat portion 65 between the depressed portion 20 and the groove portion 60 and the reflective layer 81 may also be provided in the flat portion 65.

Even in the configuration shown in FIG. 9, due to the depressed portion 20 provided above the light source 11, light traveling directly upward from the light source 11 is reduced while light traveling toward the periphery of the illuminated area A0 is increased. In addition, the groove portion 50 that is the first restricting portion and the groove portion 60 that is the second restricting portion are used to restrict traveling, toward the side of the light exit surface outside of the illuminated area A0, of light traveling from the inside toward the outside of the illuminated area A0.

Accordingly, brightness non-uniformity in the illuminated area A0 that is illuminated by the light source 11 can be suppressed and a decline in contrast between illuminated areas caused by the incidence of a luminous flux of the illuminated area A0 to another illuminated area can also be suppressed.

Although not illustrated in FIG. 10, even in the light guide plate 10 according to the present example, the dot patterns 41 and the depressed portion 30 (the second diverging portion) may be provided on the light exit surface 1A in a similar manner to FIG. 4. In addition, the dot patterns 42 may be provided in the flat portion 65 of the basal surface 1B in a similar manner to FIG. 4.

Fourth Specific Example

Figure 11:
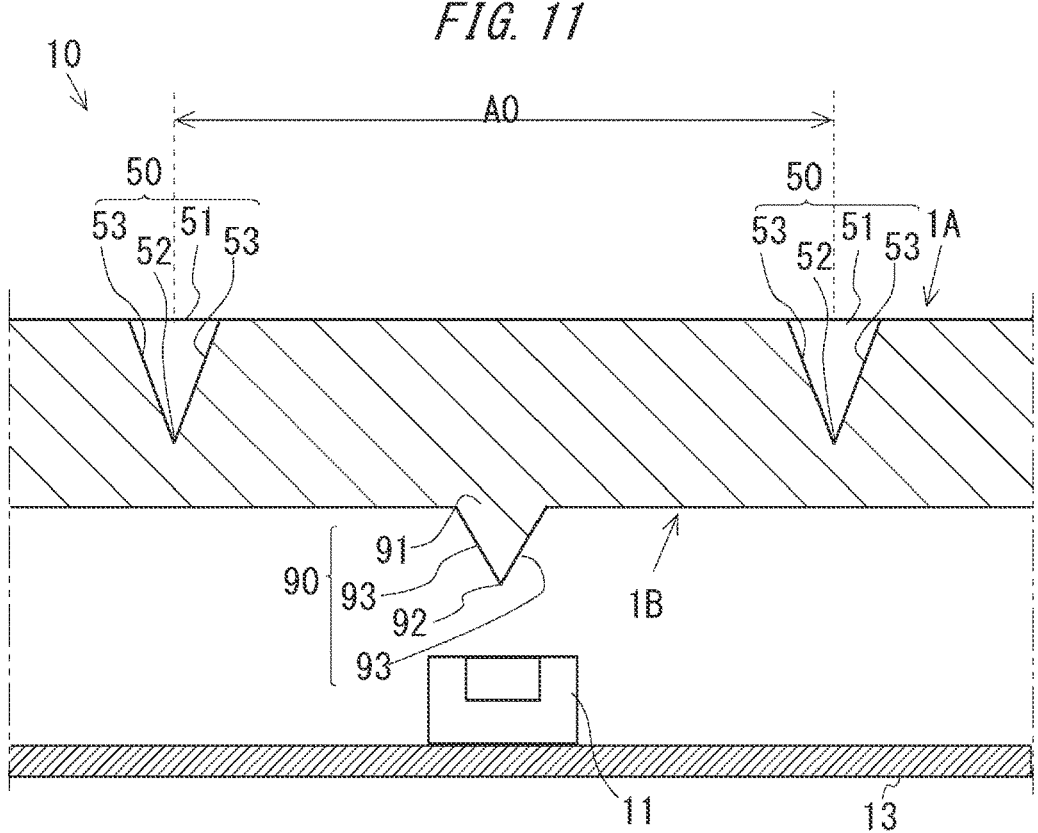
FIG. 11 is a sectional view schematically showing a fourth specific example of a light guide plate.

FIG. 11 is a sectional view schematically showing a fourth specific example of the light guide plate 10. In the present fourth specific example, components corresponding to the configurations described above will be assigned corresponding reference numerals and a description thereof will be omitted.

As shown in FIG. 11, in the present fourth specific example, a conical protruding portion 90 provided on the basal surface 1B toward a light emitting element is provided. The protruding portion 90 is a mode of the diverging portion. The protruding portion 90 has a conical shape and includes a circular bottom surface 91 and a tapered surface 93 which tapers from the bottom surface 91 toward a vertex 92.

The tapered surface 93 is a mirror surface or a smooth surface similar to a mirror surface. A diameter of the bottom surface 91 in the protruding portion 90 and a height (depth) of the protruding portion 90 are arbitrary values. Alternatively, the protruding portion 90 may have a truncated cone shape, a pyramid shape, a truncated pyramid shape, a bowl shape, a bell shape, or the like. A luminous flux emitted from the light source 11 is refracted and diverged by the tapered surface 93 of the protruding portion 90.

Even in the configuration shown in FIG. 11, the protruding portion 90 provided above the light source 11 causes a luminous flux emitted from the light source 11 to diverge so as to reduce light traveling directly upward while increasing light traveling toward the periphery of the illuminated area A0. In addition, the groove portion 50 that is a restricting portion is used to restrict traveling, toward the side of the light exit surface outside of the illuminated area A0, of light traveling from the inside toward the outside of the illuminated area A0.

Accordingly, brightness non-uniformity in the illuminated area A0 that is illuminated by the light source 11 can be suppressed and a decline in contrast between illuminated areas caused by the incidence of a luminous flux of the illuminated area A0 to another illuminated area can also be suppressed.

Although not illustrated in FIG. 11, even in the light guide plate 10 according to the present example, the dot patterns 41 and the depressed portion 30 (the second diverging portion) may be provided on the light exit surface 1A in a similar manner to FIG. 4. In addition, the dot patterns 42 may be provided in the flat portion 65 of the basal surface 1B in a similar manner to FIG. 4.

Fifth Specific Example

Figure 12:
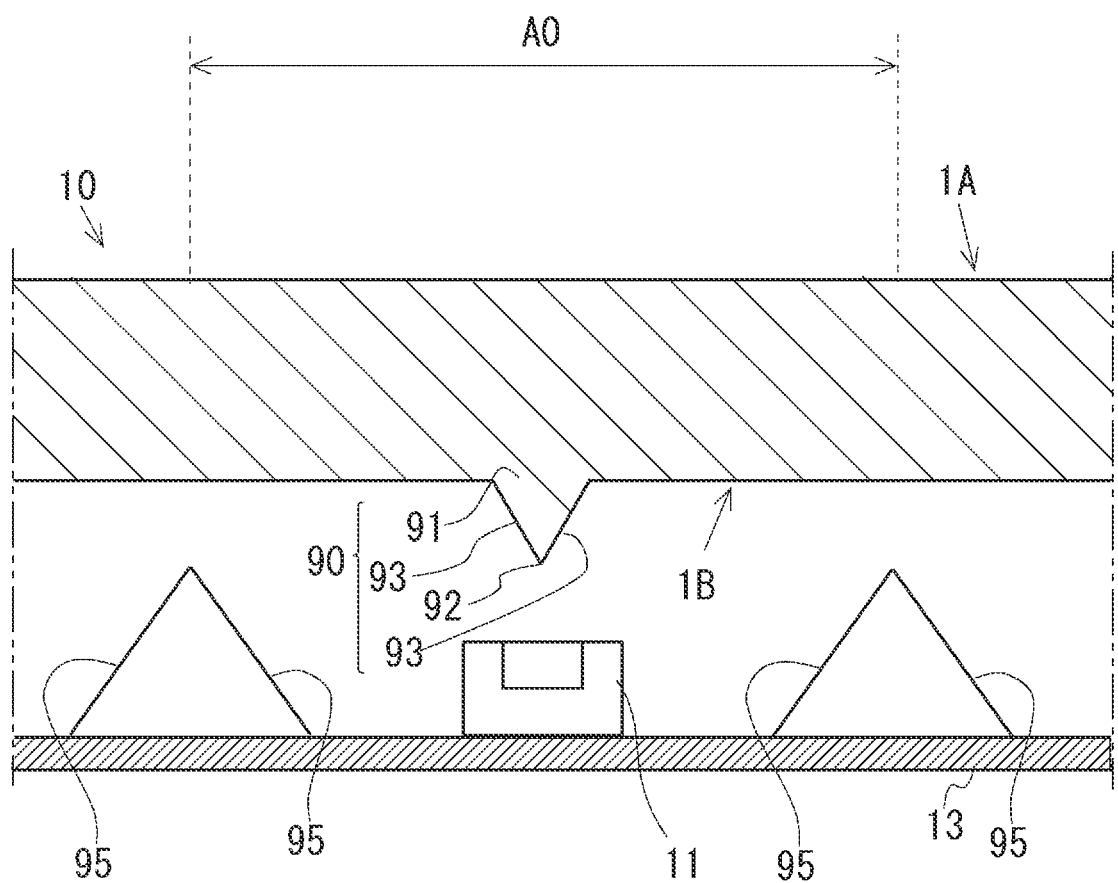
FIG. 12 is a sectional view schematically showing a fifth specific example of a light guide plate.

FIG. 12 is a sectional view schematically showing a fifth specific example in which a diverging portion is provided in the light guide plate 10 and a restricting portion is provided on a mounting substrate. In the present fifth specific example, components corresponding to the configurations described above will be assigned corresponding reference numerals and a description thereof will be omitted.

As shown in FIG. 12, in the present fifth specific example, the conical protruding portion 90 provided on the basal surface 1B toward a light emitting element is used as a diverging portion. The protruding portion 90 has a conical shape and includes the circular bottom surface 91 and the tapered surface 93 which tapers from the bottom surface 91 toward the vertex 92.

The tapered surface 93 is a mirror surface or a smooth surface similar to a mirror surface. A diameter of the bottom surface 91 in the protruding portion 90 and a height (depth) of the protruding portion 90 are arbitrary values. Alternatively, the protruding portion 90 may have a truncated cone shape, a pyramid shape, a truncated pyramid shape, a bowl shape, a bell shape, or the like. A luminous flux emitted from the light source 11 is refracted and diverged by the tapered surface 93 of the protruding portion 90.

In addition, a reflecting portion 95 is provided in a periphery of the light source 11 on the mounting substrate 13 which is a mounting surface of the light source 11. The reflecting portion 95 has a V-shaped cross section that protrudes upward from the mounting substrate 13 and has a linear shape in a plan view. The reflecting portion 95 is provided in a lattice pattern along the periphery of the illuminated area A0 in a similar manner to the groove portion 50 shown in FIG. 5.

As described above, the reflecting portion 95 is provided in the periphery of the illuminated area A0, and when light traveling from the inside toward the outside of the illuminated area A0 strikes the reflecting portion 95, the light is reflected toward the inside of the illuminated area A0. This configuration restricts traveling, toward the side of the light exit surface outside of the illuminated area A0, of light traveling from the inside toward the outside of the illuminated area A0. In the present fifth specific example, the reflecting portion 95 is a mode of the restricting portion.

Even in the configuration shown in FIG. 12, the protruding portion 90 provided above the light source 11 causes a luminous flux emitted from the light source 11 to diverge so as to reduce light traveling directly upward while increasing light traveling toward the periphery of the illuminated area A0. In addition, the reflecting portion 95 that is a restricting portion is used to restrict traveling, toward the side of the light exit surface outside of the illuminated area A0, of light traveling from the inside toward the outside of the illuminated area A0.

Accordingly, brightness non-uniformity in the illuminated area A0 that is illuminated by the light source 11 can be suppressed and a decline in contrast between illuminated areas caused by the incidence of a luminous flux of the illuminated area A0 to another illuminated area can also be suppressed.

Although not illustrated in FIG. 12, even in the light guide plate 10 according to the present example, the dot patterns 41 and the depressed portion 30 (the second diverging portion) may be provided on the light exit surface 1A in a similar manner to FIG. 4.

Sixth Specific Example

Figure 13:
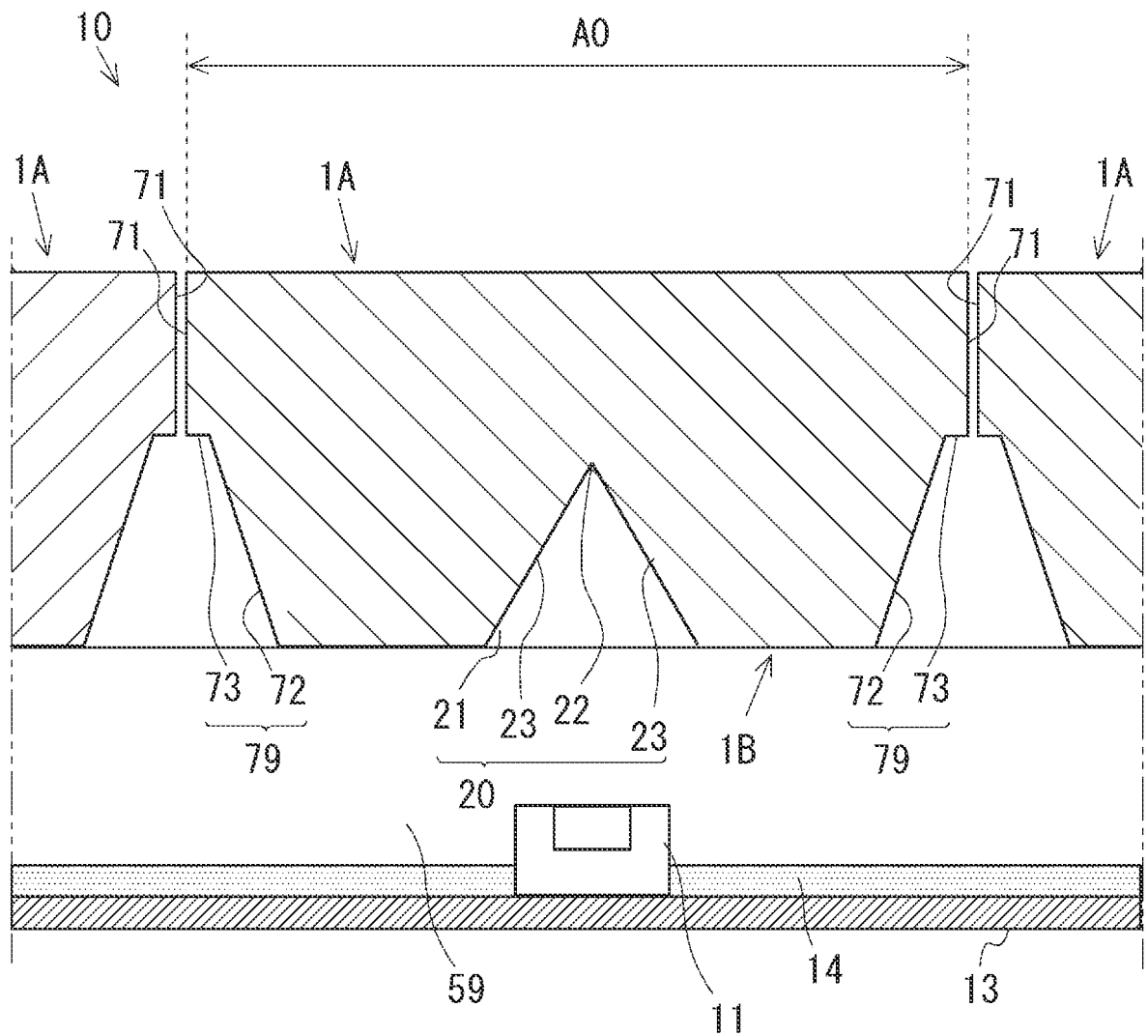
FIG. 13 is a sectional view schematically showing a sixth specific example in which a transparent resin layer is arranged between a light guide plate and a light source.

FIG. 13 is a sectional view schematically showing a sixth specific example of the planar light source apparatus 1 in which a transparent resin layer 59 is arranged between the light guide plate 10 and the light source 11. In the present sixth specific example, components corresponding to the configurations described above will be assigned corresponding reference numerals and a description thereof will be omitted.

In the sixth specific example shown in FIG. 13, the transparent resin layer 59 is arranged between the light guide plate 10 and the plurality of light sources 11 and the reflective layer 14. In particular, in the present sixth specific example, the plurality of light sources 11 are embedded in the transparent resin layer 59, and a light emitting portion of each light source 11 is covered by the transparent resin layer 59. While the light source 11 is not housed inside the depressed portion 20 of the light guide plate 10 in the present sixth specific example, the light source 11 is arranged below the depressed portion 20 and a center of the light emitting portion of the light source 11 and a center of the depressed portion 20 coincide with each other. In this case, the coincidence of the centers with each other is not limited to the centers precisely coinciding with each other and may include cases where, for example, the center of the light emitting portion of the light source 11 is positioned within a prescribed range with respect to the center of the depressed portion (for example, 10% of a width of the depressed portion).

Light emitted from the light source 11 passes through the transparent resin layer 59 and is made incident into the light guide plate 10. At this point, a luminous flux traveling toward directly above the light source 11 travels while spreading inside the transparent resin layer 59 and is refracted and further diffused when emitted into the depressed portion 20 of the light guide plate 10 from the upper surface. By providing the transparent resin layer 59 between the light guide plate 10 and the light source 11 in this manner, diffusion of a luminous flux traveling directly upward from the light source 11 is promoted and brightness inside the illuminated area A0 can be made further uniform. In addition, light which is reflected by the reflective layer 14 and which returns to the light guide plate 10 via the transparent resin layer 59 is also further diffused inside the transparent resin layer 59 and contributes to making brightness uniform. A thickness of the transparent resin layer 59 can be arbitrarily set and, for example, by increasing the thickness of the transparent resin layer 59 (making the transparent resin layer 59 thicker), a distance between the light source 11 and the light guide plate 10 can be increased. Since increasing the distance between the light source 11 and the light guide plate 10 enables an effect of making brightness uniform to be enhanced, the thickness of the transparent resin layer 59 may be set such that, while securing a distance necessary for making brightness uniform, the distance is minimized.

Figure 14:
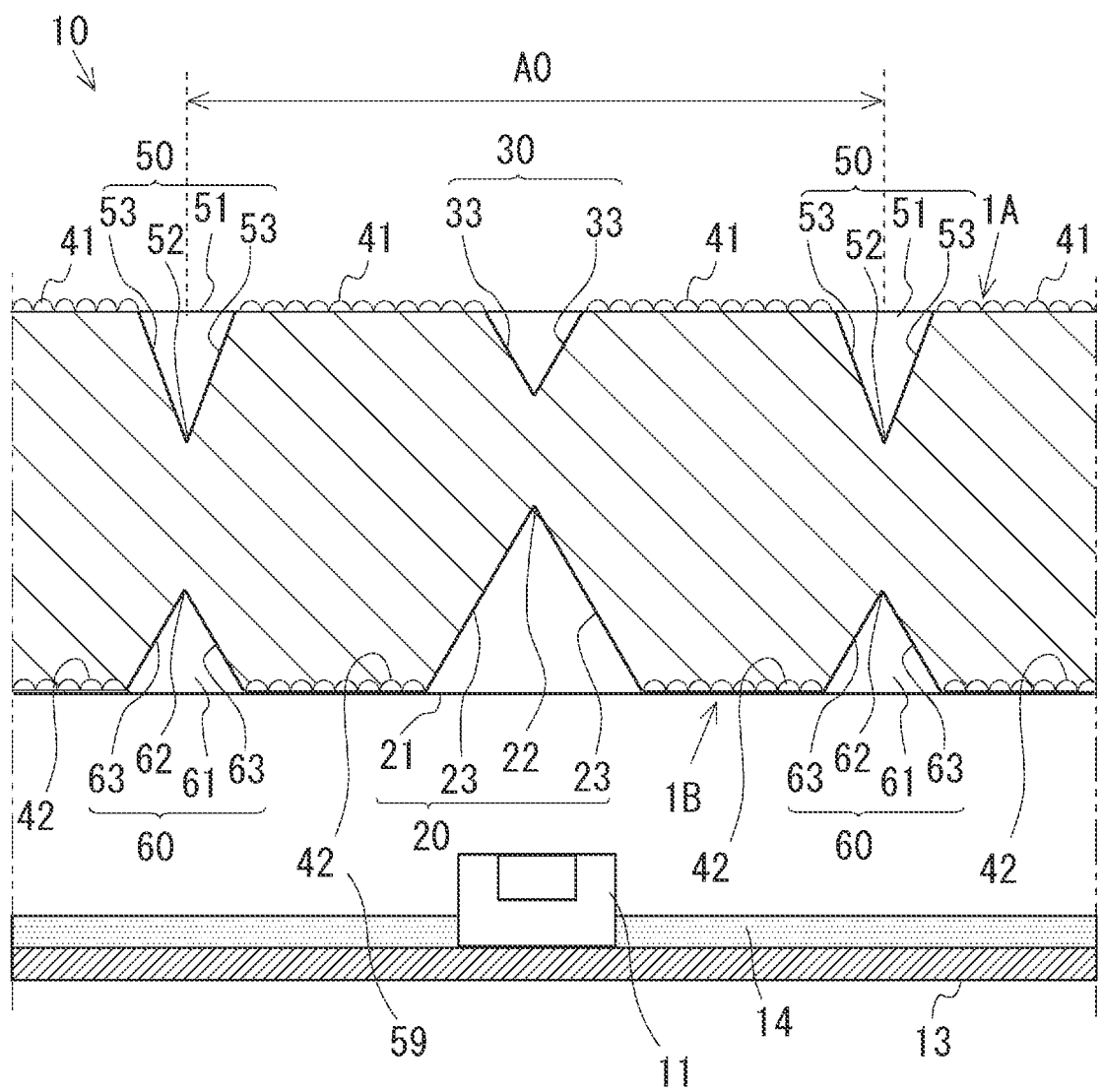
FIG. 14 is a diagram showing a first modification of the sixth specific example.

FIG. 14 is a diagram showing a first modification of the sixth specific example. While FIG. 13 shows an example of using the light guide plate 10 shown in FIG. 8, the planar light source apparatus 1 according to the sixth specific example is not limited thereto and may be configured so that the light guide plate 10 shown in FIG. 4, 9, or 10 is adopted and the transparent resin layer 59 is arranged between the light guide plate 10 and the light source 11. FIG. 14 shows an example of using the light guide plate 10 shown in FIG. 4.

Figure 15:
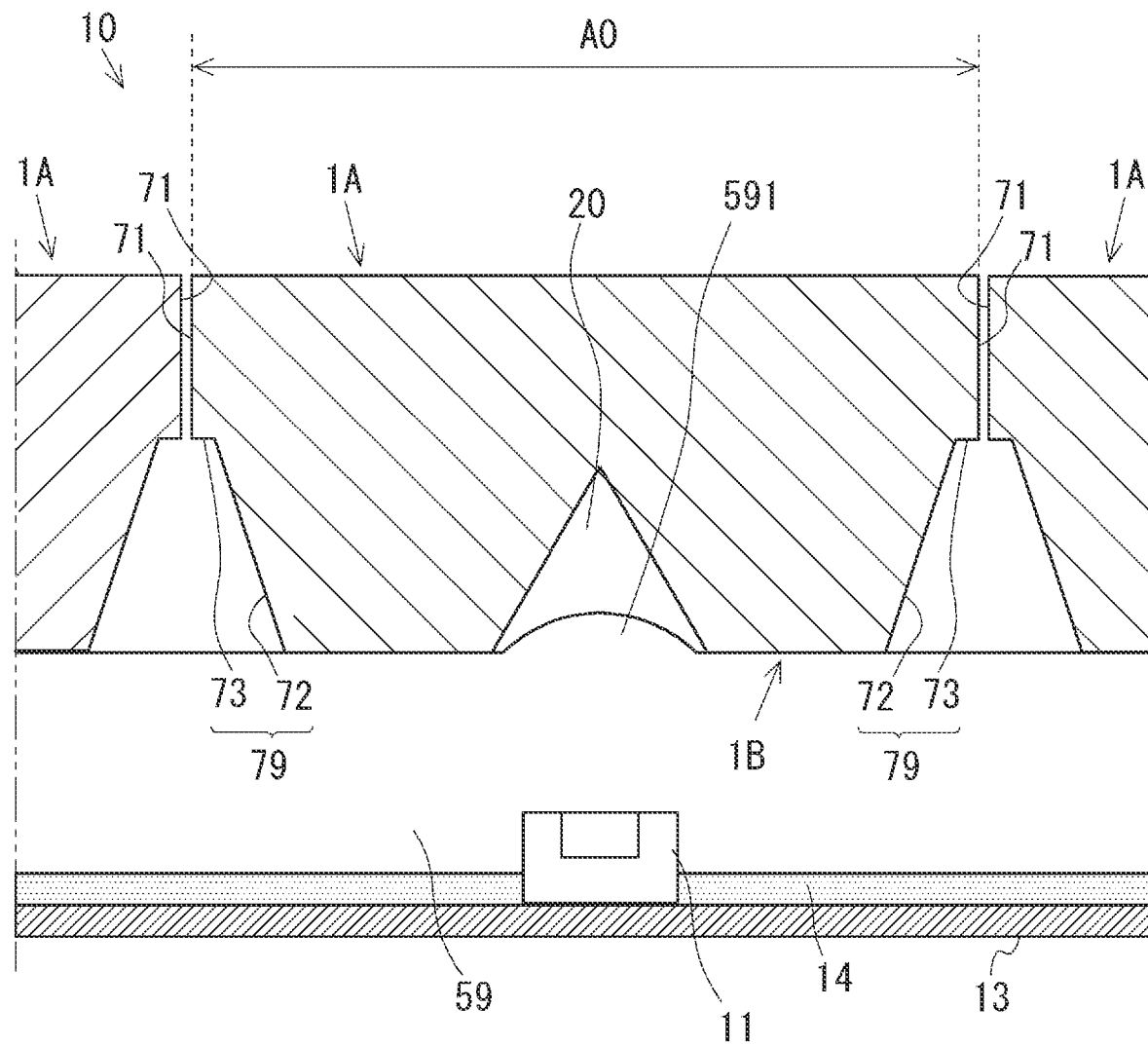
FIG. 15 is a diagram showing a second modification of the sixth specific example.

FIG. 15 is a diagram showing a second modification of the sixth specific example. While the upper surface of the transparent resin layer 59 is configured as a flat surface in FIG. 13, in the transparent resin layer 59 according to the second modification shown in FIG. 15, a protruding portion 591 which protrudes upward (toward a side of the depressed portion 20 of the light guide plate 10) is provided in a portion positioned below the depressed portion 20. While the protruding portion 591 has a hemispherical shape, alternatively, the protruding portion 591 may have a projection shape (convex shape) such as a columnar shape, a prismatic shape, a conical shape, or a pyramid shape.

Seventh Specific Example

Figure 16:
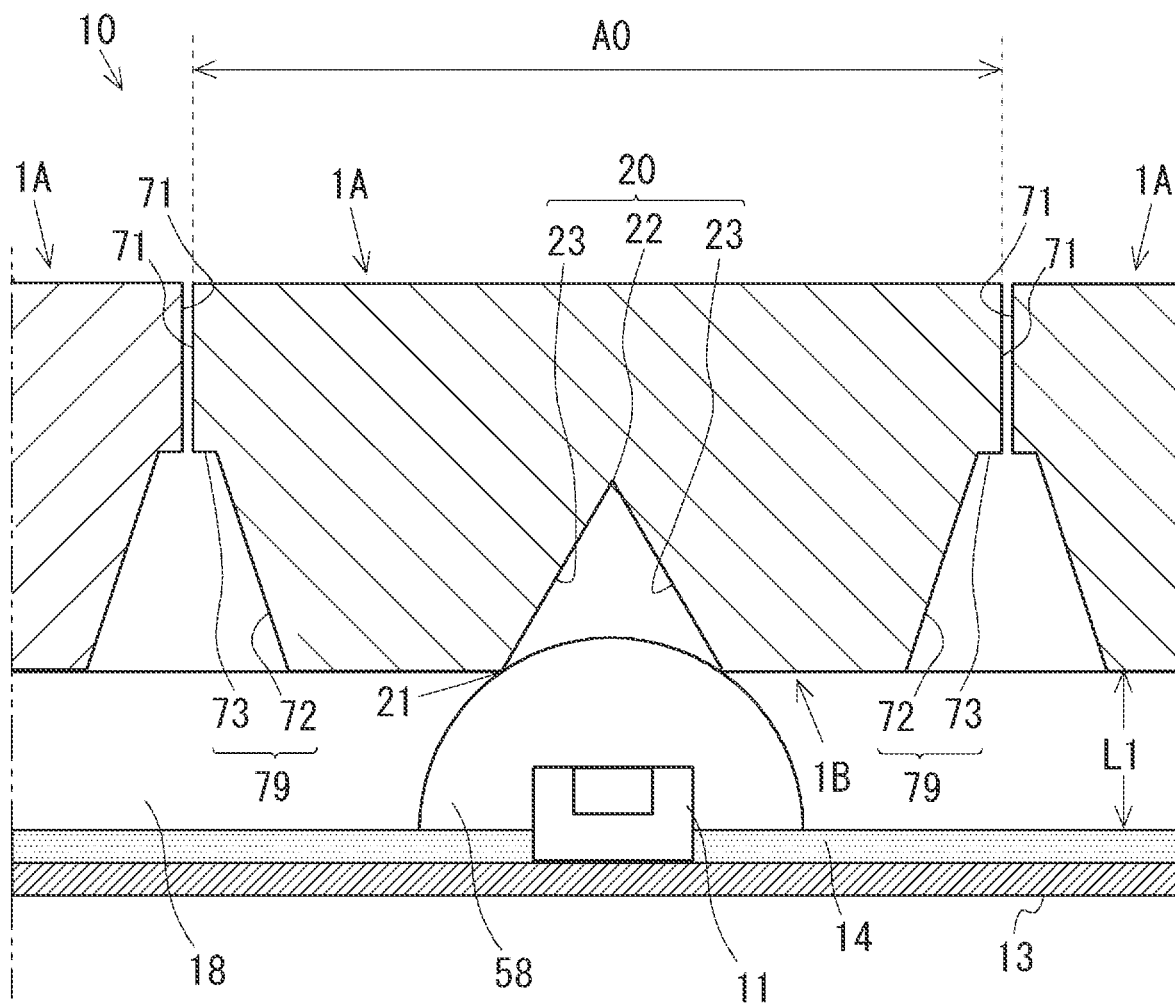
FIG. 16 is a sectional view schematically showing a seventh specific example in which a transparent resin layer is arranged between a light guide plate and a light source.

FIG. 16 is a sectional view schematically showing a seventh specific example of the planar light source apparatus 1 in which a transparent resin layer 58 is arranged between the light guide plate 10 and the light source 11. In the present seventh specific example, components corresponding to the configurations described above will be assigned corresponding reference numerals and a description thereof will be omitted.

In the seventh specific example shown in FIG. 16, the transparent resin layer 58 is arranged below the light guide plate 10 and around each of the plurality of light sources 11. Therefore, each light source 11 is embedded in each transparent resin layer 58 and a light emitting portion of the light source 11 is covered by a transparent resin layer 57. In the present seventh specific example, the light source 11 is not housed inside the depressed portion 20 of the light guide plate 10. While the transparent resin layer 58 shown in FIG. 16 has an approximately hemispherical shape, the transparent resin layer 58 is not limited to this shape and may have a projection shape (convex shape) such as a columnar shape, a prismatic shape, a conical shape, or a pyramid shape. A part of the transparent resin layer 58 may be positioned inside the depressed portion 20 of the light guide plate 10 or the transparent resin layer 58 may not be positioned inside the depressed portion 20 of the light guide plate 10. Light emitted from the light source 11 passes through the transparent resin layer 58 and is made incident into the light guide plate 10.

In addition, in the present seventh specific example, a gap 18 is provided between the basal surface 1B of the light guide plate 10 and the reflective layer 14 by causing a part of an upper surface of the transparent resin layer 58 formed in a projection shape to abut against the basal surface 1B of the light guide plate 10. A distance L1 between the basal surface 1B and the reflective layer 14 can be arbitrarily set in accordance with a height of the transparent resin layer 58. The planar light source apparatus 1 according to the present seventh specific example may be configured so that the light guide plate 10 shown in FIG. 4, 9, or 10 is adopted in place of the light guide plate 10 shown in FIG. 16 and the transparent resin layer 58 is arranged between the light guide plate 10 and the light source 11.

Eighth Specific Example

Figure 17:
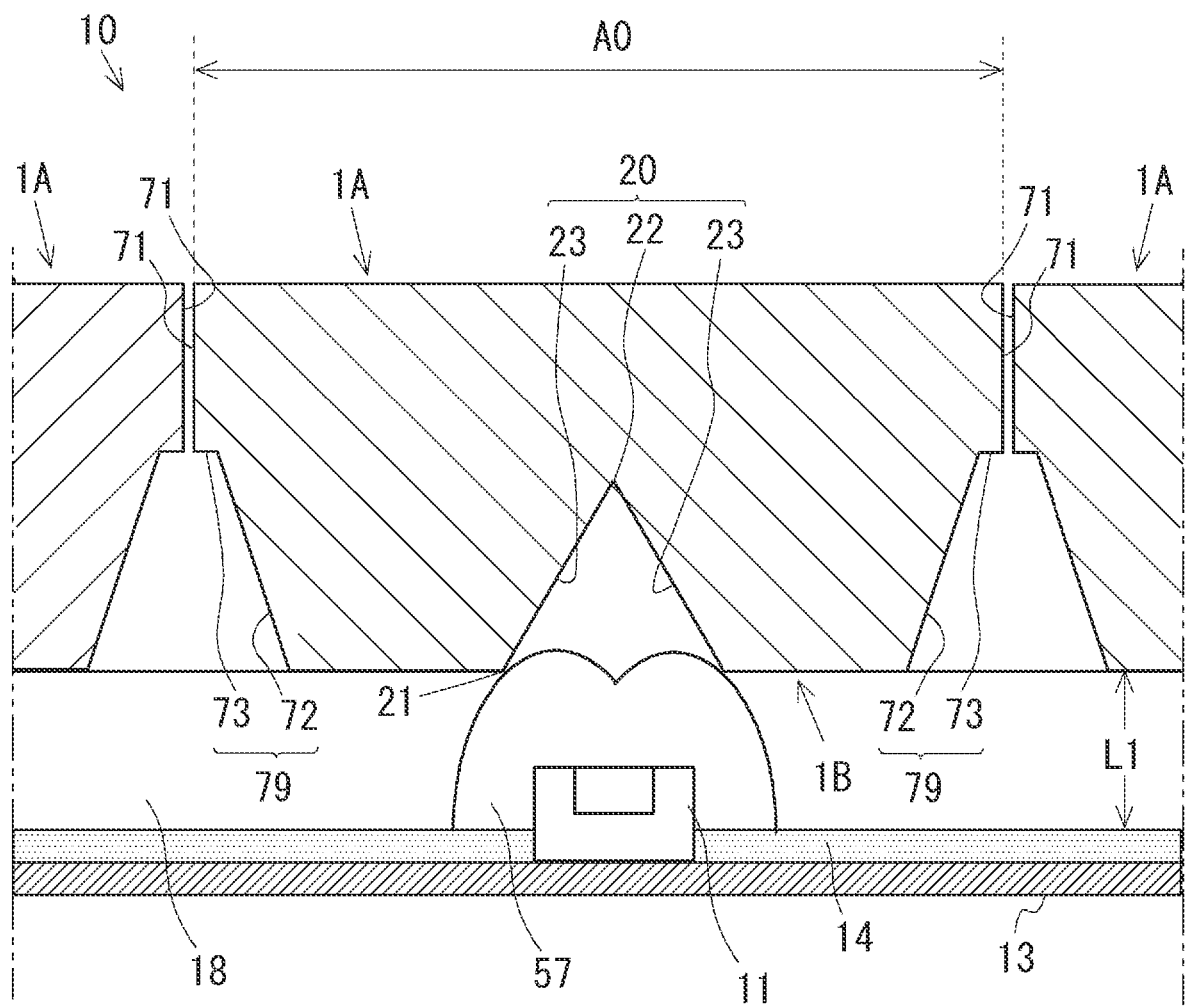
FIG. 17 is a sectional view schematically showing an eighth specific example in which a transparent resin layer is arranged between a light guide plate and a light source.

FIG. 17 is a sectional view schematically showing an eighth specific example of the planar light source apparatus 1 in which a transparent resin layer 57 is arranged between the light guide plate 10 and the light source 11. In the present eighth specific example, components corresponding to the configurations described above will be assigned corresponding reference numerals and a description thereof will be omitted.

In the eighth specific example shown in FIG. 17, the transparent resin layer 57 is arranged below the light guide plate 10 and around each of the plurality of light sources 11. Therefore, each light source 11 is embedded in each transparent resin layer 57 and a light emitting portion of the light source 11 is covered by the transparent resin layer 57. In the present eighth specific example, the light source 11 is not housed inside the depressed portion 20 of the light guide plate 10. The transparent resin layer 57 shown in FIG. 17 has an upward-convex projection shape that is, for example, a shape in which two approximately hemispherical shapes are connected to each other or a donut shape which is depressed at a center in a plan view but a periphery of the depression protrudes upward in an annular belt shape. A part of the transparent resin layer 57 may be positioned inside the depressed portion 20 of the light guide plate 10 or the transparent resin layer 57 may not be positioned inside the depressed portion 20 of the light guide plate 10. Light emitted from the light source 11 passes through the transparent resin layer 57 and is made incident into the light guide plate 10.

In addition, in the present eighth specific example, the gap 18 is provided between the basal surface 1B of the light guide plate 10 and the reflective layer 14 by causing a part of an upper surface of the transparent resin layer 57 formed in a projection shape to abut against the basal surface 1B of the light guide plate 10. A distance L1 between the basal surface 1B and the reflective layer 14 can be arbitrarily set in accordance with a height of the transparent resin layer 57. The planar light source apparatus 1 according to the present eighth specific example may be configured so that the light guide plate 10 shown in FIG. 4, 9, or 10 is adopted in place of the light guide plate 10 shown in FIG. 17 and the transparent resin layer 57 is arranged between the light guide plate 10 and the light source 11.

Ninth Specific Example

Figure 18:
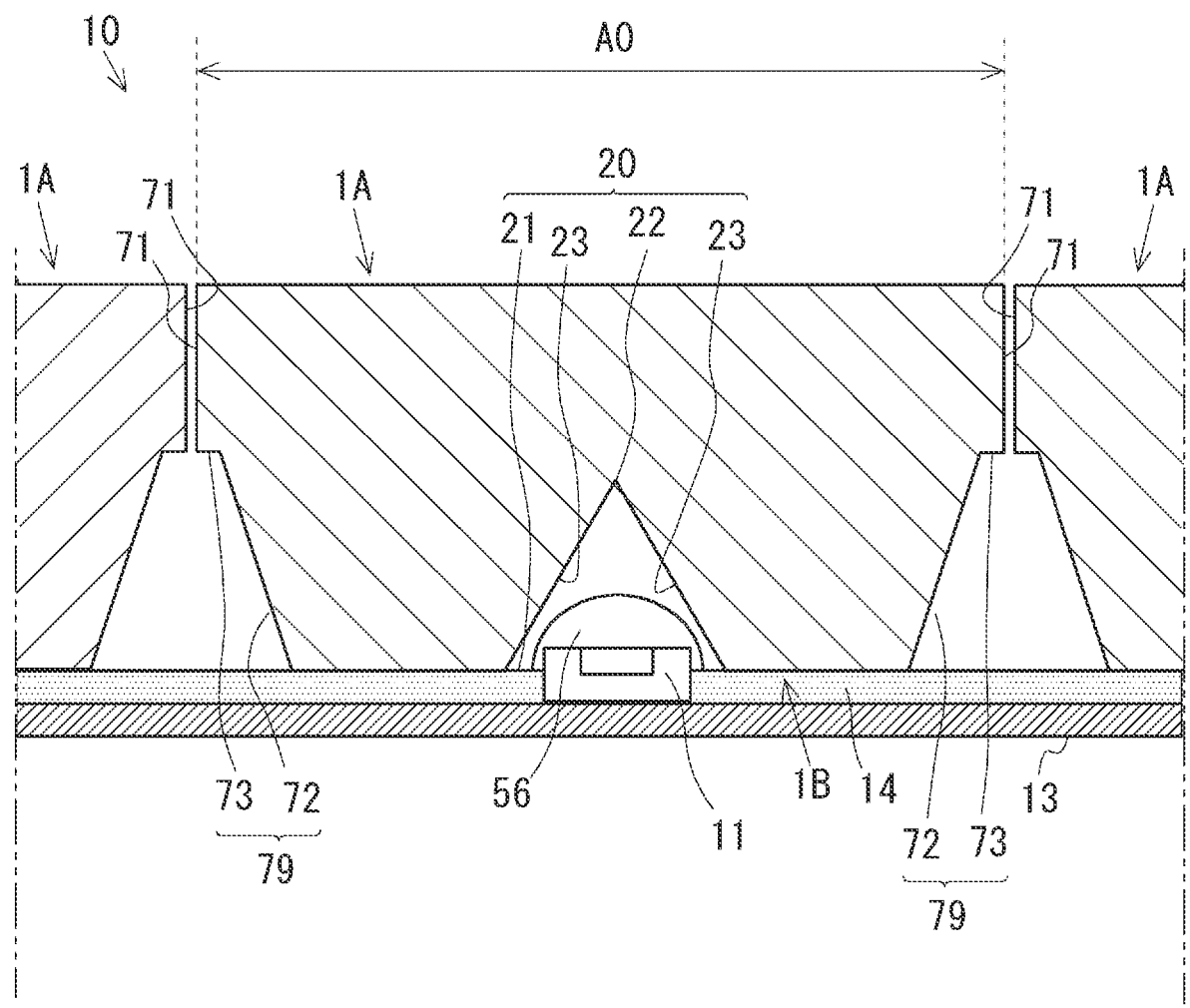
FIG. 18 is a sectional view schematically showing a ninth specific example in which a transparent resin layer is arranged between a light guide plate and a light source.

FIG. 18 is a sectional view schematically showing a ninth specific example of the planar light source apparatus 1 in which a transparent resin layer 56 is arranged between the light guide plate 10 and the light source 11. In the present ninth specific example, components corresponding to the configurations described above will be assigned corresponding reference numerals and a description thereof will be omitted.

In the ninth specific example shown in FIG. 18, a plurality of transparent resin layers 56 are arranged below the light guide plate 10 and the transparent resin layer 56 is arranged between the light guide plate 10 and each of the plurality of light sources 11. Therefore, each light source 11 is embedded in each transparent resin layer 56 and a light emitting portion of the light source 11 is covered by the transparent resin layer 56. In the present ninth specific example, the light source 11 and the transparent resin layer 56 are housed inside the depressed portion 20 of the light guide plate 10 and the basal surface 1B of the light guide plate 10 and the reflective layer 14 are in contact with each other. In other words, the light guide plate 10 and the reflective layer 14 are in close contact with each other. The bottom surface (opening) 21 of the depressed portion 20 of the light guide plate 10 and the transparent resin layer 56 may be in contact with each other or the bottom surface 21 of the depressed portion 20 of the light guide plate 10 and the transparent resin layer 56 may not be in contact with each other. The tapered surface 23 of the depressed portion 20 of the light guide plate 10 and the transparent resin layer 56 may be in contact with each other or the tapered surface 23 of the depressed portion 20 of the light guide plate 10 and the transparent resin layer 56 may not be in contact with each other. While the transparent resin layer 56 shown in FIG. 18 has an approximately hemispherical shape, the transparent resin layer 56 is not limited to this shape and may have a projection shape (convex shape) such as a columnar shape, a prismatic shape, a conical shape, or a pyramid shape. Light emitted from the light source 11 passes through the transparent resin layer 56 and is made incident into the light guide plate 10. The planar light source apparatus 1 according to the present ninth specific example may be configured so that the light guide plate 10 shown in FIG. 4, 9, or 10 is adopted in place of the light guide plate 10 shown in FIG. 18 and the transparent resin layer 56 is arranged between the light guide plate 10 and the light source 11.

Tenth Specific Example

Figure 19:
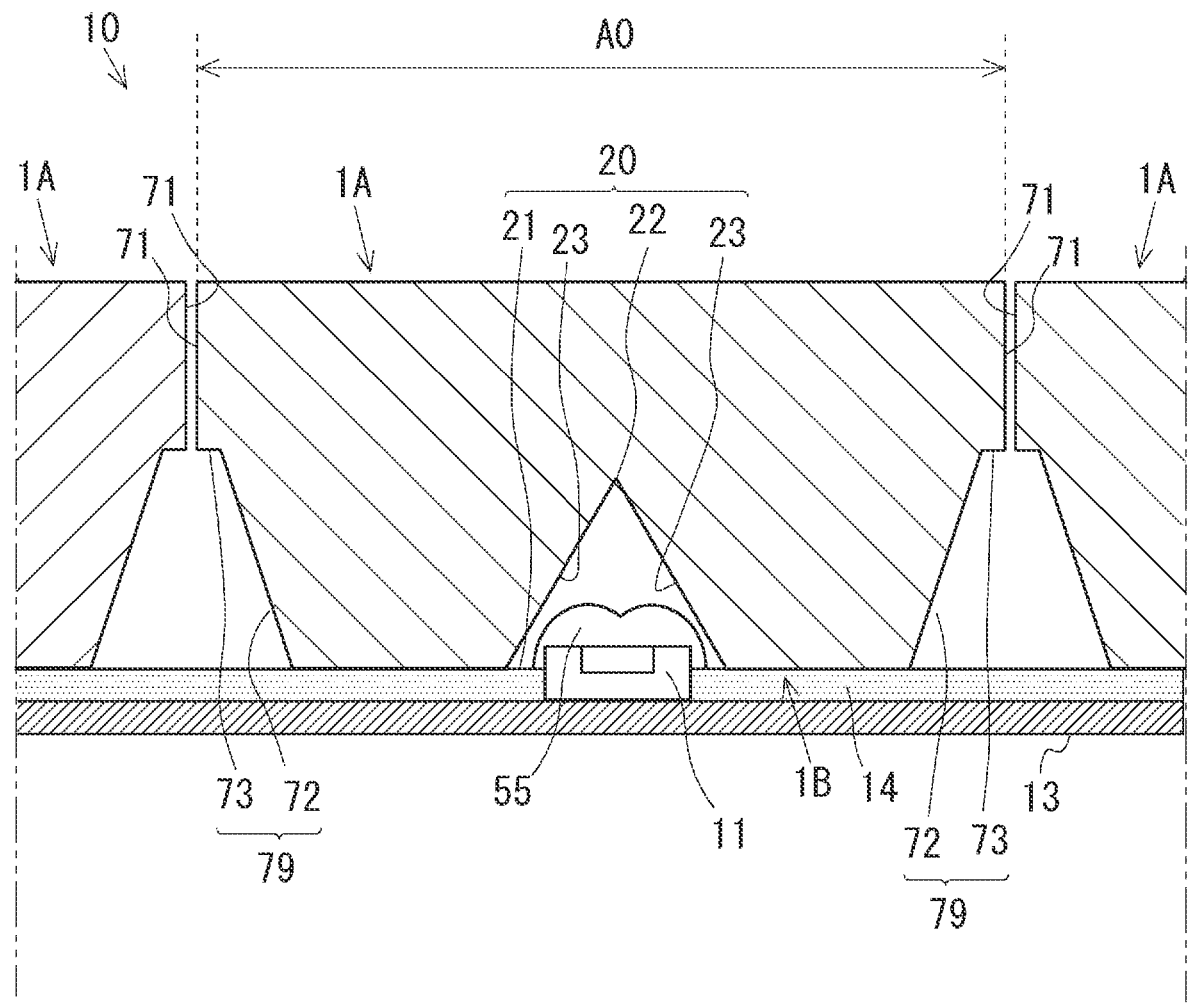
FIG. 19 is a sectional view schematically showing a tenth specific example in which a transparent resin layer is arranged between a light guide plate and a light source.

FIG. 19 is a sectional view schematically showing a tenth specific example of the planar light source apparatus 1 in which a transparent resin layer 55 is arranged between the light guide plate 10 and the light source 11. In the present tenth specific example, components corresponding to the configurations described above will be assigned corresponding reference numerals and a description thereof will be omitted.

In the tenth specific example shown in FIG. 19, a plurality of transparent resin layers 55 are arranged below the light guide plate 10 and the transparent resin layer 55 is arranged between the light guide plate 10 and each of the plurality of light sources 11. Therefore, each light source 11 is embedded in each transparent resin layer 55 and a light emitting portion of the light source 11 is covered by the transparent resin layer 55. In the present tenth specific example, the light source 11 and the transparent resin layer 55 are housed inside the depressed portion 20 of the light guide plate 10. The basal surface 1B of the light guide plate 10 and the reflective layer 14 are in contact with each other. In other words, the light guide plate 10 and the reflective layer 14 are in close contact with each other. The bottom surface 21 of the depressed portion 20 of the light guide plate 10 and the transparent resin layer 55 may be in contact with each other or the bottom surface 21 of the depressed portion 20 of the light guide plate 10 and the transparent resin layer 55 may not be in contact with each other. The tapered surface 23 of the depressed portion 20 of the light guide plate 10 and the transparent resin layer 55 may be in contact with each other or the tapered surface 23 of the depressed portion 20 of the light guide plate 10 and the transparent resin layer 55 may not be in contact with each other. The transparent resin layer 55 has an upward-convex projection shape that is, for example, a shape in which two approximately hemispherical shapes are connected to each other or a donut shape which is depressed at a center in a plan view but a periphery of the depression protrudes upward in an annular belt shape. Light emitted from the light source 11 passes through the transparent resin layer 55 and is made incident into the light guide plate 10. The planar light source apparatus 1 according to the present tenth specific example may be configured so that the light guide plate 10 shown in FIG. 4, 9, or 10 is adopted in place of the light guide plate 10 shown in FIG. 19 and the transparent resin layer 55 is arranged between the light guide plate 10 and the light source 11.

Eleventh Specific Example

Figure 20:
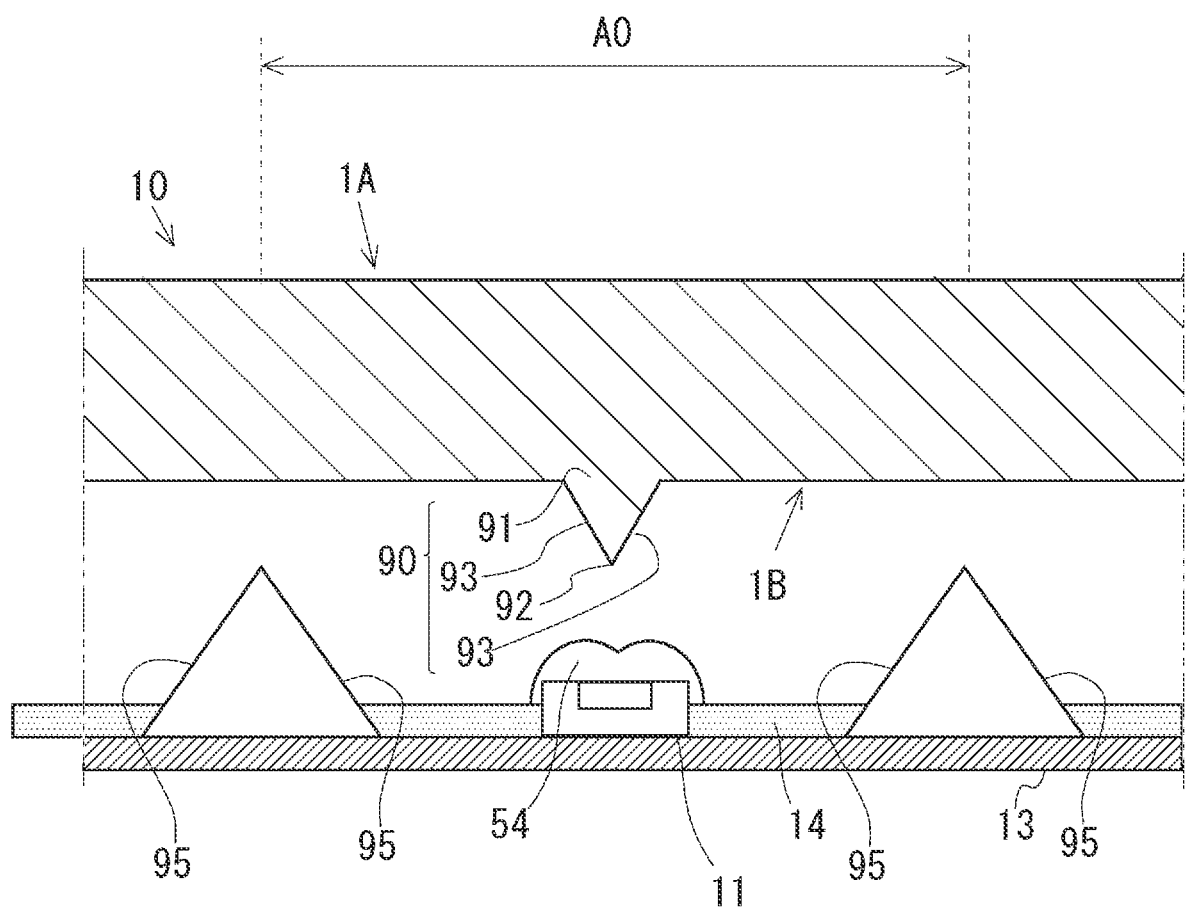
FIG. 20 is a sectional view schematically showing an eleventh specific example in which a transparent resin layer is arranged between a light guide plate and a light source.

FIG. 20 is a sectional view schematically showing an eleventh specific example of the planar light source apparatus 1 in which a transparent resin layer 54 is arranged between the light guide plate 10 and the light source 11. In the present eleventh specific example, components corresponding to the configurations described above will be assigned corresponding reference numerals and a description thereof will be omitted.

In the eleventh specific example shown in FIG. 20, a plurality of transparent resin layers 54 are arranged below the light guide plate 10 and the transparent resin layer 54 is arranged between the light guide plate 10 and each of the plurality of light sources 11. Therefore, each light source 11 is embedded in each transparent resin layer 54 and a light emitting portion of the light source 11 is covered by the transparent resin layer 54. In the present eleventh specific example, the basal surface 1B of the light guide plate 10 and the reflective layer 14 are held at a prescribed distance by a spacer (not illustrated) and the light guide plate 10 and the reflective layer 14 are separated from each other. A vertex (lower portion) of the protruding portion 90 of the light guide plate 10 and the transparent resin layer 54 may be in contact with each other or the vertex (lower portion) of the protruding portion 90 of the light guide plate 10 and the transparent resin layer 54 may not be in contact with each other.

The transparent resin layer 54 has an upward-convex projection shape that is, for example, a shape in which two approximately hemispherical shapes are connected to each other or a donut shape which is depressed at a center in a plan view but a periphery of the depression protrudes upward in an annular belt shape. Alternatively, the transparent resin layer 54 may have a hemispherical shape as in the case of the transparent resin layer 56 shown in FIG. 18. Light emitted from the light source 11 passes through the transparent resin layer 54 and is made incident into the light guide plate 10.

In the specific examples shown in FIGS. 13 to 17, the light sources 11 and the depressed portions 20 of the light guide plate 10 overlap with one another and the light sources 11 are arranged below the depressed portions 20 of the light guide plate 10 when viewed from a normal direction of the light exit surface 1A of the light guide plate 10. By arranging any of the transparent resin layers 57 to 59 between the light guide plate 10 and the light sources 11, a distance between the light guide plate 10 and the light sources 11 can be kept constant without increasing the thickness of the light guide plate 10. By separating the light guide plate 10 and the light sources 11 from each other without housing the light sources 11 inside the depressed portions 20 of the light guide plate 10, a spread of light incident into the light guide plate 10 can be increased. Thicknesses of the transparent resin layers 57 to 59 are arbitrary. By changing the thicknesses of the transparent resin layers 57 to 59, the distance between the light guide plate 10 and the light sources 11 can be changed. For example, by changing the thicknesses of the transparent resin layers 57 to 59 in accordance with a type of the light sources 11, the distance between the light guide plate 10 and the light sources 11 can be changed in accordance with the type of the light sources 11.

In the specific examples shown in FIGS. 18 to 20, the light sources 11 and the depressed portions 20 of the light guide plate 10 overlap with one another and the light sources 11 are arranged below the depressed portions 20 of the light guide plate 10 when viewed from a normal direction of the light exit surface 1A of the light guide plate 10. Accordingly, a luminous flux emitted from the light sources 11 is caused to diverge by the upper surface of the transparent resin layers 54 to 56 and a spread of light incident into the light guide plate 10 widens. Thicknesses of the transparent resin layers 54 to 56 are arbitrary. For example, the thicknesses of the transparent resin layers 54 to 56 may be changed in accordance with the type of the light sources 11.

A display apparatus including the light guide plate 10 described in the first to fifth specific examples of the embodiment described above can be mounted to various electronic devices. Examples of electronic devices provided with such a display apparatus include a smartphone, a digital camera, a tablet terminal, an electronic book, a wearable device, a car navigation apparatus, an electronic dictionary, and an electronic billboard. Using the light guide plate and the display apparatus according to the embodiment enables brightness non-uniformity of electronic devices to be reduced while reducing sizes and thicknesses of the electronic devices.

REFERENCE SIGNS LIST

1 Planar light source apparatus
1A Light exit surface
1B Basal surface
2 Display panel
10 Light guide plate
11 Light source
12 Frame
13 Mounting substrate
14 Reflective layer
15 Diffusing sheet
16 Prism sheet
17 Light shielding member
20, 30 Depressed portion
21 Opening
22 Vertex
23 Tapered surface
30 Depressed portion
41, 42 Dot pattern
54 to 59 Transparent resin layer

The invention claimed is:

1. A planar light source apparatus, comprising:
   a plurality of light guide plates which is provided with a gap between respective side surfaces of each of the light guide plates, each of the light guide plates including a light exit surface from which light is emitted, a lower surface provided on an opposite side of the light exit surface, and the side surfaces; and
   a light source which is arranged inside an opening of each of the light guide plates, the light source including a light emitting surface provided on the lower surface side with respect to the light exit surface of the light guide plate and surrounded by the light guide plate,
   wherein each of the side surfaces of the light guide plates has an inclined portion that extends toward the lower surface side, a width of the gap between each of the light guide plates in the inclined portion is wide at the lower surface side and narrows toward the light exit surface side.

2. The planar light source apparatus according to claim 1, wherein a diffusing portion which diffuse light are provided on the light exit surface of the light guide.

3. The planar light source apparatus according to claim 2, wherein the diffusing portion is a concave portion provided on the light emitting surface of the light guide plates.

4. The planar light source apparatus according to claim 1, wherein
   a reflective layer is provided on the inclined portion of the light guide plates.

5. The planar light source apparatus according to claim 1, wherein
   a substrate is provided at the side of the lower surface with respect to the light guide plates, and
   a reflective layer is provided on the light guide plates side of the substrate.

6. The planar light source apparatus according to claim 5, wherein the reflective layer is in contact with the bottom of the light source.

7. The planar light source apparatus according to claim 6, wherein the reflective layer is provided at a portion facing the light guide plates of the substrate and a portion facing the gap between the side surfaces of each of the light guide plates of the substrate.

8. The planar light source apparatus according to claim 1, further comprising a transparent portion that covers the light source inside the opening.

9. A display apparatus, comprising:

the planar light source apparatus according to claim 1; and a display panel which receives light emitted from the planar light source apparatus.

10. An electronic device comprising the display apparatus according to claim 9.

* * * * *